(12) United States Patent
Saitou et al.

(10) Patent No.: US 8,437,691 B2
(45) Date of Patent: May 7, 2013

(54) MOBILE COMMUNICATIONS TERMINAL AND COMMUNICATION CONTROL METHOD

(75) Inventors: Naoyuki Saitou, Kawasaki (JP);
Takeshi Takano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 765 days.

(21) Appl. No.: 12/406,380

(22) Filed: Mar. 18, 2009

(65) Prior Publication Data

US 2009/0239466 A1    Sep. 24, 2009

(30) Foreign Application Priority Data

Mar. 19, 2008    (JP) .................................. 2008-072558

(51) Int. Cl.
*H04B 7/15* (2006.01)
(52) U.S. Cl.
USPC .......................................... 455/11.1; 455/101
(58) Field of Classification Search .................. 455/7, 9, 455/11.1, 13.1, 13.4, 16, 70, 101
See application file for complete search history.

(56) References Cited

U.S. PATENT DOCUMENTS

| | | |
|---|---|---|
| 2007/0123245 A1 | 5/2007 | Hu |
| 2008/0181168 A1* | 7/2008 | Han et al. ...................... 370/315 |
| 2009/0074189 A1* | 3/2009 | Ryu et al. ...................... 380/277 |
| 2009/0088164 A1* | 4/2009 | Shen et al. .................... 455/436 |
| 2010/0009624 A1* | 1/2010 | Youn et al. ........................ 455/9 |
| 2010/0046413 A1* | 2/2010 | Jin et al. ......................... 370/315 |

FOREIGN PATENT DOCUMENTS

| | | |
|---|---|---|
| JP | 7-245581 A | 9/1995 |
| JP | 2001-237764 | 8/2001 |
| JP | 2006-165623 A | 6/2006 |
| JP | 2007-151006 A | 6/2007 |

OTHER PUBLICATIONS

"IEEE 802.16j-06/026r2: Baseline Document for Draft Standard for Local and Metropolitan Area Networks", Part 16: Air Interface for Fixed and Mobile Broadband Wireless Access Systems; Multihop Relay Specification Feb. 9, 2007.
"IEEE std 802.16e(tm)—2005 for Local and metropolitan area networks", Part 16: Air Interface for Fixed and Mobile Broadband Wireless Access Systems; Amendment 2: Physical and Medium Access Control Layers for Combined Fixed and Mobile Operation in Licensed Bands and Corrigendum 1 Feb. 28, 2006.
Japanese Office Action mailed Apr. 10, 2012 for corresponding Japanese Application No. 2008-072558, with English-language Translation.
Sydir et al., "802.16j (Mobile Multihop Relay) Usage Models," IEEE C802.16j-06/026r0, IEEE 802.16 Broadband Wireless Access Group http://ieee802.org/16, May 1, 2006, 25 pages.

* cited by examiner

*Primary Examiner* — Henry Choe
(74) *Attorney, Agent, or Firm* — Fujitsu Patent Center

(57) ABSTRACT

A mobile communications terminal is disclosed that includes a determination part configured to determine whether to perform relay control based on a signal received from at least one of a radio base station, a stationary relay station, and another mobile communications terminal performing relay control and a control part configured to control the mobile communications terminal so that the mobile communications terminal performs an operation as a relay station in response to the determination part determining to perform the relay control.

16 Claims, 14 Drawing Sheets

MOBILE COMMUNICATIONS TERMINAL AND COMMUNICATION CONTROL METHOD

BACKGROUND OF THE INVENTION

1. Field of the Invention

The present invention relates to mobile radio communications technologies.

2. Description of the Related Art

In recent years, studies have been made of a multi-hop relay communications system in order to cover an area where the quality of communications with a base station (BS) is poor. This is partly due to an increase in the need for providing cheaper high-capacity, high-speed data communications to end users.

Base stations are connected directly to an access network with lines through, for example, Ethernet (registered trademark). These lines include optical fibers. For example, a network is constructed as illustrated in FIG. 1. Referring to FIG. 1, an access network 10 is included in an IP core network. The IP core network includes IP routers and Ethernet lines. The access network 10 and radio base stations (BS#1, BS#2, and BS#3) are connected with IP routers, Ethernet lines and radio circuits. Mobile stations (MS) communicate with radio base stations through radio communications interfaces. The mobile stations include mobile terminals.

In the case of performing multi-hop relay communications, there is wireless access between radio base stations and mobile stations, and there is also wireless access between radio base stations and radio relay stations (RS) (RS#11, RS#12, RS#21, RS#22, and RS#31), which perform radio relaying and transferring. (For example, see Japanese Laid-Open Patent Application No. 2001-237764.) The radio relay stations are capable of further accessing other different radio relay stations. By thus performing communications between radio base stations and mobile stations through multiple radio relay stations, it is possible to perform radio relaying of cascading connection. There is constant wireless access between radio relay stations and radio base stations. The radio relay stations are statically installed in corresponding service areas.

For example, there is wireless access between each radio relay station and multiple mobile stations in a radio communications area covered by the radio relay station. Further, there is also wireless access between the radio relay station and a radio base station. The communications data transmitted by the mobile stations having wireless access to the radio relay station are received by the radio base station via the radio relay station. The radio base station transmits the received communications data to the core network.

Multi-hop relay communications dispense with a fiber connection to a radio base station, which is made in the case of installing an optical extension station extended with a line from a large-capacity radio base station. Therefore, it is possible to cover an area of a poor radio propagation environment, such as an urban area, in multi-hop relay communications.

Specifications for multi-hop relay communications are being prepared by a standards body. (For example, see IEEE 802.16j.) Accordingly, mobile communications services with such radio relay stations are not actually provided.

However, the above-described background technology has problems such as those described below.

An area is often dotted with points where received power is significantly reduced, depending heavily on the location of installation of a radio base station. In such points where received power is significantly reduced, the quality of radio communications is too degraded to provide services. In order to cover such dead points of radio signals where received power is significantly reduced, it is necessary to install a new radio base station or an antenna transmission and reception part in the area. Therefore, the cost of facility installation and operating cost tend to increase. In the communications industry, this increase in costs has been becoming a major problem in providing cheap data communications services.

Further, in the case of application of multi-hop relay communications, a stationary radio base station and a stationary radio relay station installed at certain locations in a service area of mobile radio communications cannot cover the service area completely. This causes points where radio propagation loss significantly increases.

SUMMARY OF THE INVENTION

Embodiments of the present invention may solve or reduce one or more of the above-described problems.

According to one embodiment of the present invention, a mobile communications terminal and a communication control method are provided in which one or more of the above-described problems may be solved or reduced.

According to one embodiment of the present invention, a mobile communications terminal and a communication control method are provided that are capable of relaying data in an area where the quality of communications is not ensured.

According to one embodiment of the present invention, a mobile communications terminal is provided that includes a determination part configured to determine whether to perform relay control based on a signal received from at least one of a radio base station, a stationary relay station, and another mobile communications terminal performing relay control, and a control part configured to control the mobile communications terminal so that the mobile communications terminal performs an operation as a relay station in response to the determination part determining to perform the relay control.

According to one embodiment of the present invention, a communication control method in a radio communications system having multi-hop relay communications applied thereto is provided that includes a mobile communications terminal determining whether to perform relay control based on a downlink signal received from at least one of a radio base station, a stationary relay station, and another mobile communications terminal performing relay control, and the mobile communications terminal performing control so as to perform an operation as a relay station in response to determining to perform the relay control.

Thus, according to one aspect of the present invention, a mobile communications terminal is provided that can relay data, and a communication control method is provided that enables a mobile communications terminal to relay data.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
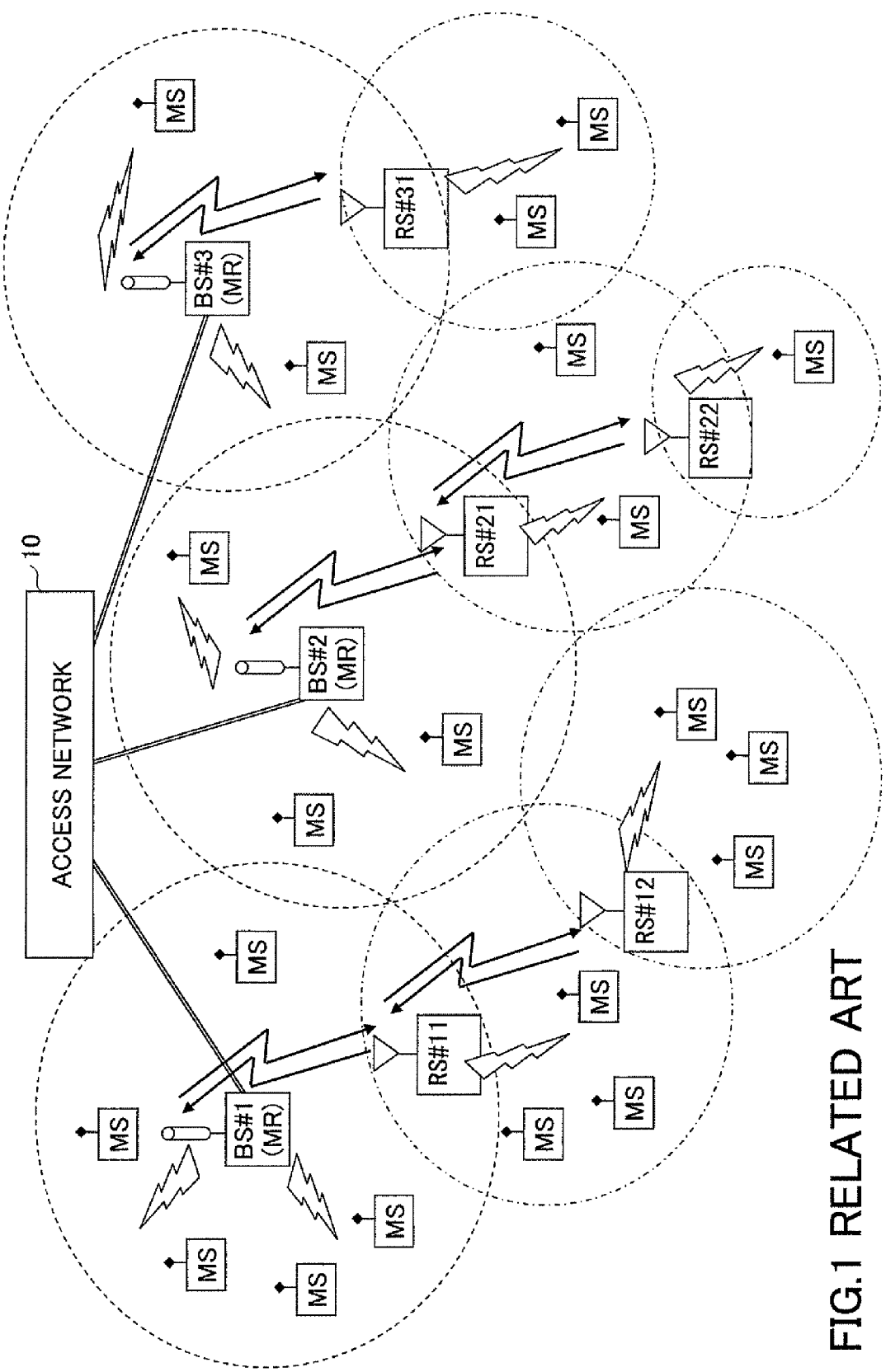
FIG. 1 is a diagram illustrating communications between radio base stations and radio relay stations.

A description is given below, with reference to the accompanying drawings, of embodiments of the present invention.

In the drawings for illustrating embodiments, the elements having the same function are referred to by the same reference numeral, and a repetitive description thereof is omitted.

First Embodiment

Time Division Duplex (TDD) is applied to a radio communications system according to this embodiment. According to TDD, full duplex communications are performed by switching an uplink and a downlink at high speed. An uplink transmission signal and a downlink transmission signal may be transmitted in the same transmission band.

Figure 2:
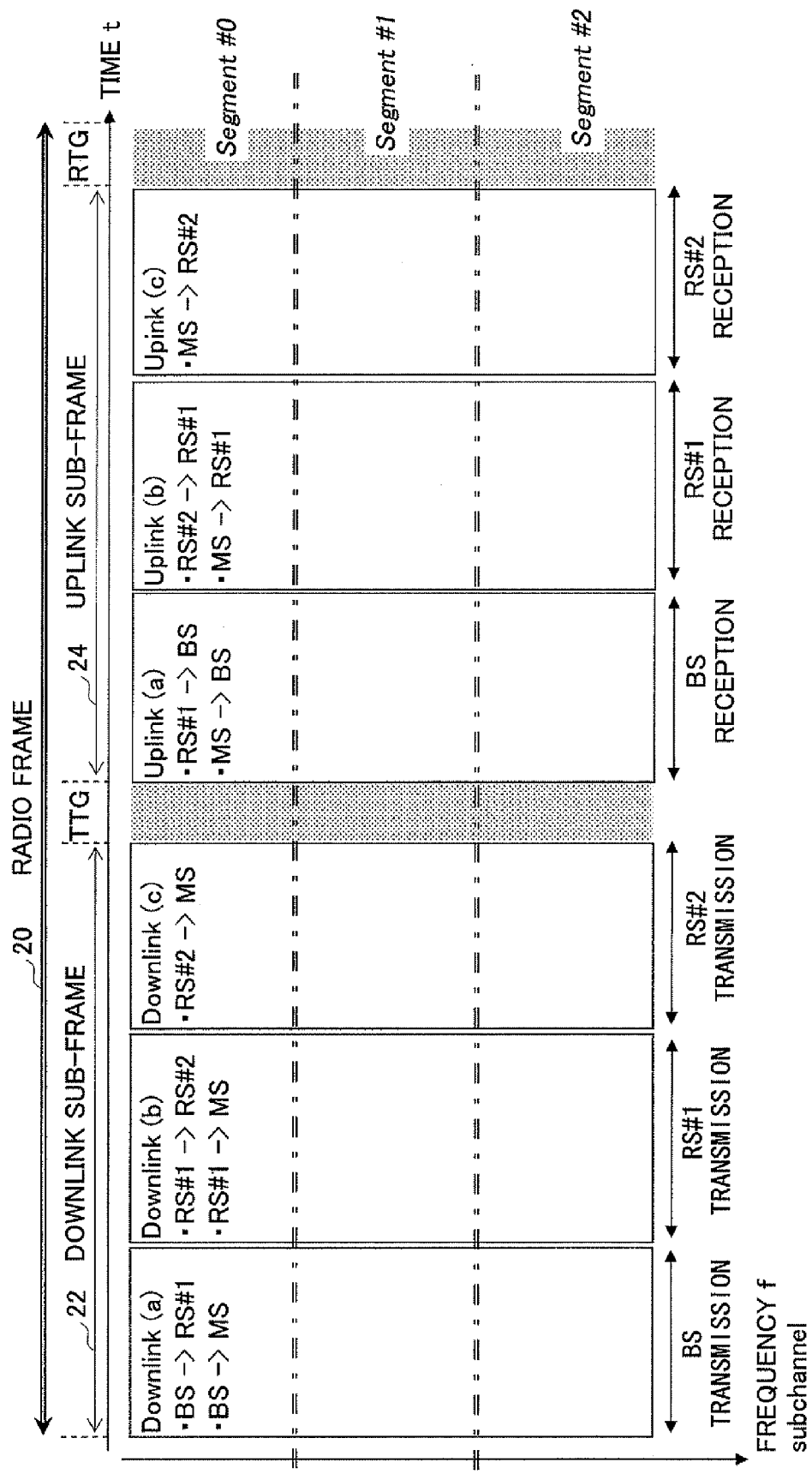
FIG. 2 is a diagram illustrating a frame structure in multi-hop relay communications according to a first embodiment of the present invention.

For example, referring to FIG. 2, which is a diagram for illustrating a frame structure in multi-hop relay communications, a transmission frame (radio frame) 20 in TDD includes a downlink sub-frame 22 in which a downlink signal is transmitted and an uplink sub-frame 24 in which an uplink signal is transmitted. Further, each of the downlink (DL) sub-frame 22 and the uplink (UL) sub-frame 24 includes multiple Orthogonal Frequency Division Multiplexing (OFDM) symbols. The number of OFDM signal symbols included in the downlink sub-frame 22 and the number of OFDM signal symbols included in the uplink sub-frame 24 may be the same or different. A cyclic prefix (CP) is positioned between OFDM symbols. For example, a CP is placed between symbols by adding a signal, which is a direct copy of a signal portion of a predetermined length from the end of a symbol, to the front of the symbol.

Further, OFDM/Orthogonal Frequency Division Multiple Access (OFDMA) is applied to the radio communications system according to this embodiment. Radio communications systems that satisfy these requirements include Worldwide Interoperability for Microwave Access (WiMAX). Accordingly, in this embodiment, a description is given, taking WiMAX as an example radio communications system. The present invention is also applicable to radio communications systems other than WiMAX as long as they satisfy these requirements.

Figure 3:
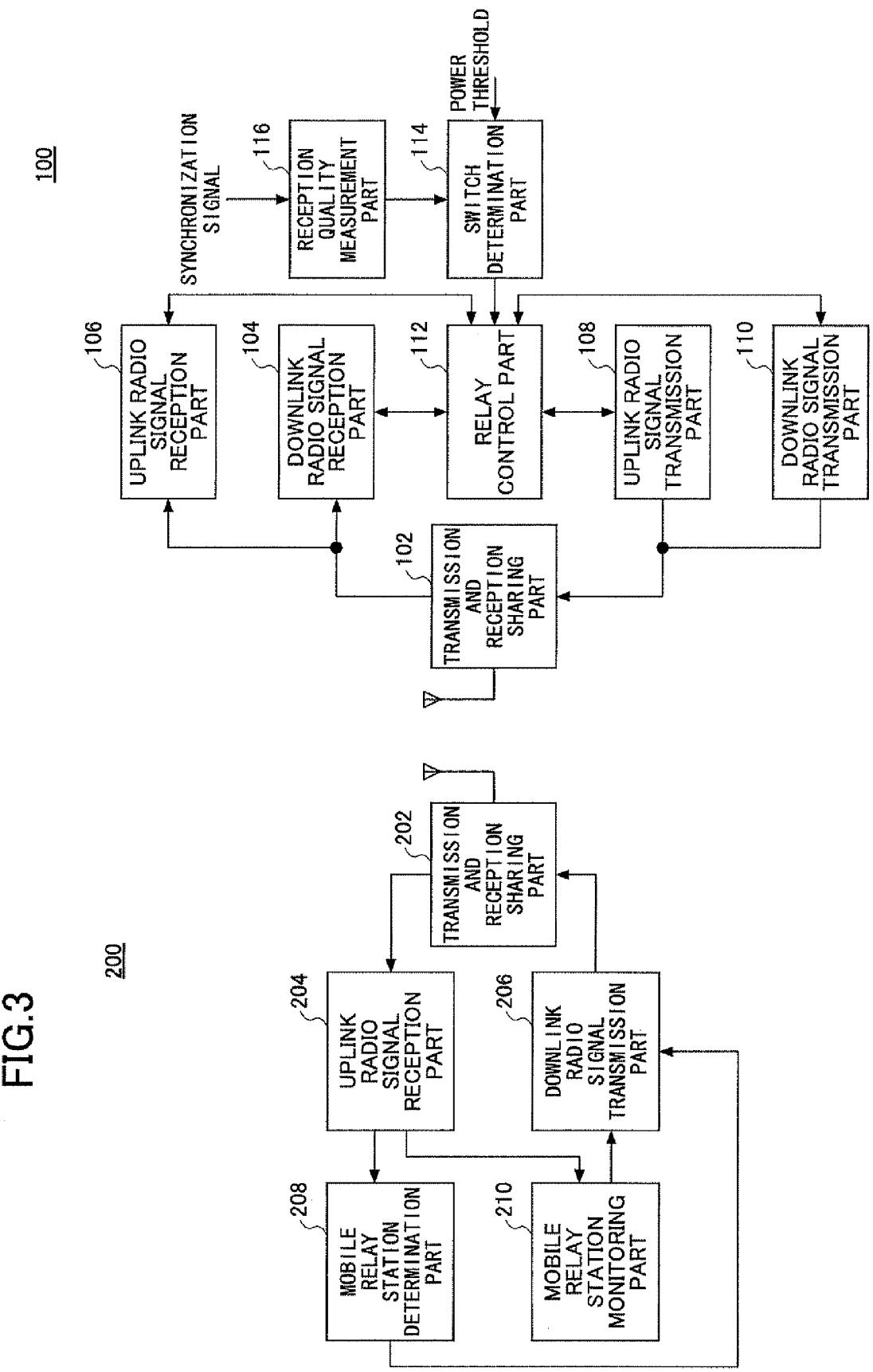
FIG. 3 is a block diagram showing part of a mobile communications terminal and a radio base station according to the first embodiment of the present invention.

FIG. 3 is a block diagram showing part of a mobile communications terminal and a radio base station according to this embodiment.

Referring to FIG. 3, the radio communications system according to this embodiment includes a mobile communications terminal 100 and a radio base station 200. The radio base station 200 and the mobile communications terminal 100 perform radio communications according to TDD. The transmission frame 20 in TDD includes the downlink sub-frame 22 in which a downlink signal is transmitted and the uplink sub-frame 24 in which an uplink signal is transmitted. as shown in FIG. 2. That is, a pair of downlink and uplink sub-frames forms a single radio frame. Further, the downlink subchannels include a preamble, a frame control header (FCH), a downlink map (DL-MAP), an uplink map (UL-MAP), and a downlink burst (DL burst). The downlink burst may be segmented (divided) into multiple regions. The uplink subchannels include a ranging region and an uplink burst (UL burst). The uplink burst may be segmented (divided) into multiple regions.

For example, each of the downlink sub-frame 22 dedicated for transmission and the uplink sub-frame 24 dedicated for reception is divided in the direction of the time axis as shown in FIG. 2. The divisions of the sub-frame may be referred to as "access slots." For example, the access slots include a radio base station access slot (BS access slot) in which a radio base station makes access and relay station access slots (RS#1 access slot and RS#2 access slot) in which corresponding relay stations make access.

A description is given, with reference to FIG. 3, of the mobile communications terminal 100 according to this embodiment. Examples of the mobile communications terminal 100 according to this embodiment include movable terminals such as a mobile phone and a personal computer (PC) having a communication function.

The mobile communications terminal 100 according to this embodiment includes a transmission and reception sharing part 102. The transmission and reception sharing part 102 causes an uplink and a downlink to be shared with a common (shared) antenna.

Further, the mobile communications terminal 100 according to this embodiment includes a downlink radio signal reception part 104. The downlink radio signal reception part 104 may receive a downlink signal transmitted by or from the radio base station 200 or a relay station. Further, if there is another mobile communications terminal where relay control is being performed, the downlink radio signal reception part 104 may receive a downlink signal transmitted by or from the radio base station 200, a relay station, or the other mobile communications terminal where relay control is being performed. Here, the mobile communications terminal where relay control is being performed refers to a mobile communications terminal operating as a relay. Hereinafter, the mobile communications terminal operating as a relay is referred to as "a mobile relay station." In the case where the mobile communications terminal 100 itself performs relaying (relay control), the signal transmitted by or from the radio base station 200, a relay station, or a mobile relay station and received by the downlink radio signal reception part 104 may be transmitted (relayed) to a relay station, a mobile relay station, or a mobile communications terminal by a below-described downlink radio signal transmission part 110.

Further, the mobile communications terminal 100 according to this embodiment includes an uplink radio signal reception part 106. The uplink radio signal reception part 106 may receive an uplink signal transmitted by or from another mobile communications terminal or a relay station in the case of the mobile communications terminal 100 itself performing relaying (relay control). Further, if there is a mobile relay station, the uplink radio signal reception part 106 may receive an uplink signal transmitted by or from another mobile communications terminal, a relay station, or the mobile relay station.

Further, the mobile communications terminal 100 according to this embodiment includes an uplink radio signal transmission part 108. The uplink radio signal transmission part 108 transmits a generated uplink signal to the radio base station 200 or a relay station. Further, if there is a mobile relay station, the uplink radio signal transmission part 108 transmits a generated uplink signal to one of the radio base station 200, a relay station, and the mobile relay station. Further, in the case where the mobile communications terminal 100 itself performs relaying (relay control), the uplink radio signal transmission part 108 may transmit (relay) an uplink signal transmitted by or from another mobile communications terminal, a relay station, or a mobile relay station and received by the uplink radio signal reception part 106 to the radio base station 200, a relay station, or a mobile relay station.

Further, the mobile communications terminal 100 according to this embodiment includes the downlink radio signal transmission part 110. The downlink radio signal transmission part 110 may transmit a signal transmitted by or from the radio base station 200, a relay station, or a mobile relay station and received by the downlink radio signal reception part 104 to a relay station, a mobile relay station, or another mobile communications terminal in the case of the mobile communications terminal 100 itself performing relaying (relay control).

Further, the mobile communications terminal 100 according to this embodiment includes a relay control part 112. The relay control part 112 performs relay control in accordance with the result of the determination by a below-described switching determination part 114. For example, if the switching determination part 114 determines that relay control be performed and inputs a relay control switch command to the relay control part 112, the relay control part 112 generates a mobile relay station switch authorization request, and commands the uplink radio signal transmission part 108 to transmit the generated mobile relay station switch authorization request. As a result, the mobile relay station switch authorization request is transmitted from the mobile communications terminal 100 to the radio base station 200. Then, the relay control part 112 transmits a downlink signal for notifying other mobile communications terminals of the transmission of the mobile relay station switch authorization request. For example, the downlink signal includes a provisional signal. This provisional signal may be a downlink sub-frame that contains only a preamble. By thus transmitting a provisional signal, it is possible to notify other mobile communications terminals of the existence of the mobile communications terminal 100 that has transmitted a mobile relay station switch authorization request. Accordingly, when the mobile communications terminal 100 that has transmitted the mobile relay station switch authorization request is switched to a mobile relay station, it is possible to prevent another mobile communications terminal that can perform communications via the mobile relay station from transmitting a mobile relay station switch authorization request.

Further, the relay control part 112 starts relay control in response to reception of a switch authorization signal transmitted from the radio base station 200 as a response to the mobile relay station switch authorization request. Specifically, the relay control part 112 controls the downlink radio signal transmission part 110 so as to transmit a downlink signal transmitted by or from the radio base station 200 or a relay station and received by the downlink radio signal reception part 104 to a relay station or another mobile communications terminal. Further, the relay control part 112 controls the uplink radio signal transmission part 108 so as to transmit an uplink signal transmitted by or from a relay station or another mobile communications terminal and received by the uplink radio signal reception part 106 to a relay station or the radio base station 200.

Further, for example, if there is another one or more mobile relay stations, the relay control part 112 controls the downlink radio signal transmission part 110 so as to transmit a downlink signal transmitted by or from the radio base station 200, a relay station, or another mobile relay station and received by the downlink radio signal reception part 104 to a relay station, another mobile relay station, or another mobile communications terminal. Further, the relay control part 112 controls the uplink radio signal transmission part 108 so as to transmit an uplink signal transmitted by or from a relay station, a mobile relay station, or another mobile communications terminal and received by the uplink radio signal reception part 106 to the radio base station 200, a relay station, or another mobile relay station.

Further, the mobile communications terminal 100 according to this embodiment includes a switch determination part 114. The switch determination part 114 determines whether to perform relay control. For example, the switch determination part 114 determines whether to perform relay control based on the reception field strength input by a below-described reception quality measurement part 116. If the switch determination part 114 determines that relay control be performed, the switch determination part 114 inputs a relay control switch command to the relay control part 112. Unless the mobile communications terminal 100 is in a failed state, the switch determination part 114 determines that relay control be performed irrespective of the condition of the mobile communications terminal 100, for example, whether a user of the mobile communications terminal 100 is performing packet or voice communications or the mobile communications terminal 100 is in a sleep mode, as long as the mobile communications terminal 100 can perform normal radio access communications.

Further, the mobile communications terminal 100 according to this embodiment includes the reception quality measurement part 116. The reception quality measurement part 116 measures the reception quality of a downlink signal transmitted by or from the radio base station 200. Alternatively, the reception quality measurement part 116 may measure the reception field strength and/or the received power of the downlink signal transmitted by or from the radio base station 200. Further, the reception quality measurement part 116 measures the reception quality of a downlink signal transmitted by or from a relay station. Alternatively, the reception quality measurement part 116 may measure the reception field strength and/or the received power of the downlink signal transmitted by or from the relay station. Further, the reception quality measurement part 116 measures the reception quality of a downlink signal transmitted by or from another mobile relay station. Alternatively, the reception quality measurement part 116 may measure the reception field strength and/or the received power of the downlink signal transmitted by or from the other mobile relay station. Here, the downlink signal includes a synchronization signal. For example, the synchronization signal includes cell synchronization information such as a preamble, a frame control header, and a DL-MAP.

The reception quality measurement part 116 inputs the measured reception quality to the switch determination part 114. Alternatively, the reception quality measurement part 116 may input the measured reception field strength and/or received power to the switch determination part 114. A description is given below of the case where the reception quality measurement part 116 inputs measured received power to the switch determination part 114. Alternatively, the reception quality measurement part 116 may input measured reception quality and/or reception field strength to the switch determination part 114. Here, what the reception quality measurement part 116 measures is not limited to reception quality, reception field strength, and received power.

Figure 4:
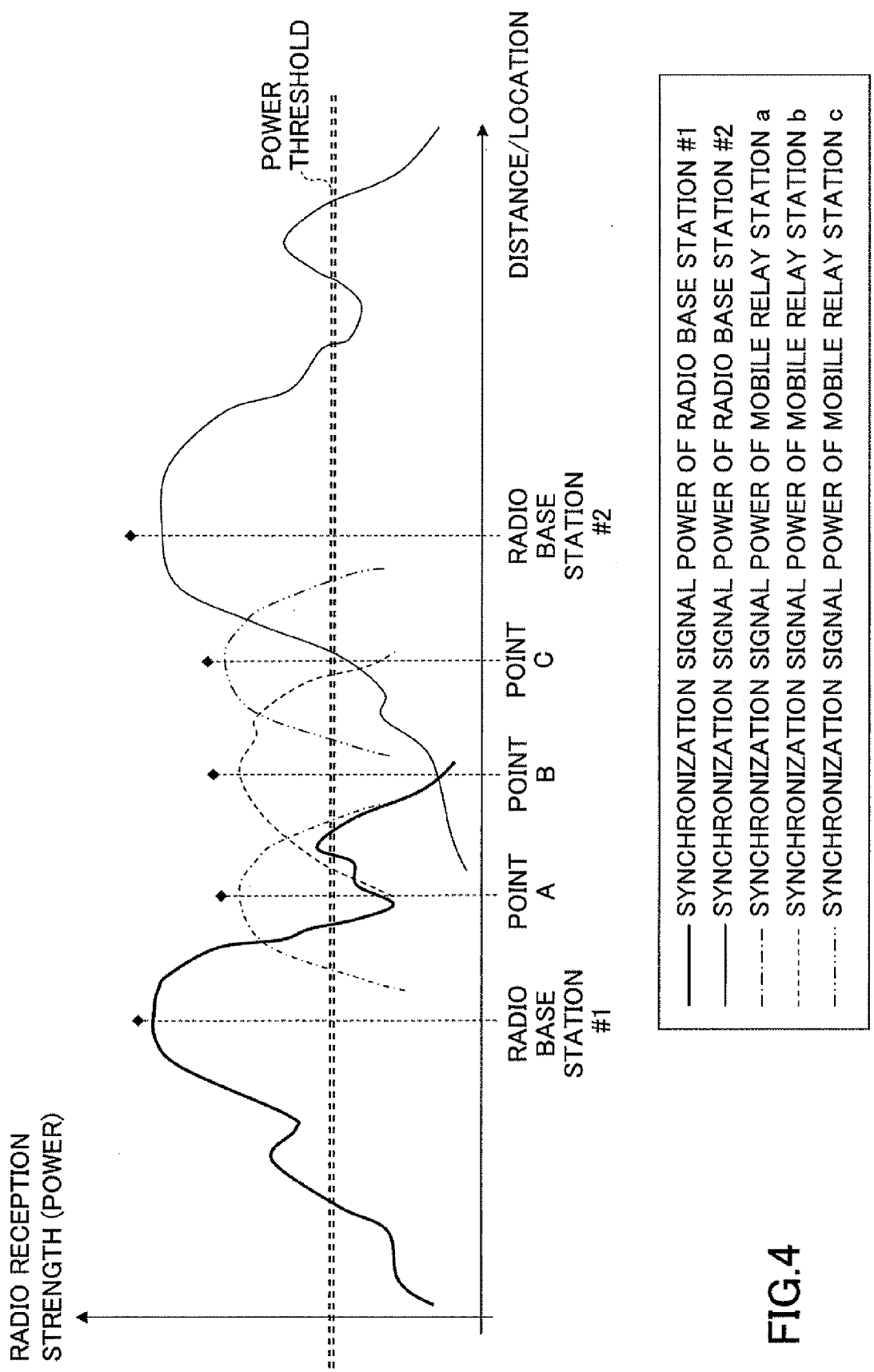
FIG. 4 is a diagram illustrating the switching of the mobile communications terminal to a mobile relay station according to the first embodiment of the present invention.

Next, a description is given in detail, with reference to FIG. 4, of the above-described switch determination part 114.

FIG. 4 is a diagram imaging part of a radio communications area in the case of the mobile communications terminal 100 switching to a mobile relay station according to this embodiment. In FIG. 4, the horizontal axis represents a distance or location, and the vertical axis represents radio reception strength, such as received power.

First, a description is given of the case where a mobile communications terminal $100_1$ (an example of the mobile communications terminal 100) is positioned at Point A with a radio base station #1 (an example of the radio base station 200) and a radio base station #2 (an example of the radio base station 200) being installed.

At Point A, a downlink signal transmitted from the radio base station #1 is detected. The received power (level) of the downlink signal at Point A enables communications, but is less than an electric power threshold (power threshold) that is set arbitrarily. As described above, the downlink signal includes a synchronization signal. In this case, the mobile communications terminal $100_1$ positioned at Point A operates as a mobile relay station. Hereinafter, the mobile communications terminal $100_1$ operating as a mobile relay station is referred to as "mobile relay station a. For example, the power threshold is the received power level in the case where the received power level of a downlink signal transmitted from the radio base station #1 or #2, a relay station, or another mobile communications terminal enables communications with the radio base station #1 or #2, the relay station, or the other mobile communications terminal but is not expected to be able to ensure sufficient quality of the communications.

Specifically, the reception quality measurement part 116 of the mobile communications terminal $100_1$ measures the received power level of a downlink signal in response to detection of the downlink signal. For example, the reception quality measurement part 116 of the mobile communications terminal $100_1$ measures the received power level of the downlink signal transmitted by the radio base station #1. At Point A, a downlink signal transmitted by the radio base station #2 is not detected. The reception quality measurement part 116 inputs the measured received power level of the downlink signal to the switch determination part 114. The switch determination part 114 determines whether the input received power level of the downlink signal is less than the power threshold.

If the input received power level of the downlink signal is less than the power threshold, the switch determination part 114 inputs a relay control switch command for requesting execution of relay control to the relay control part 112. In response to the relay control switch command input by the switch determination part 114, the relay control part 112 generates a mobile relay station switch authorization request, and commands the uplink radio signal transmission part 108 to transmit the generated mobile relay station switch authorization request. As a result, the mobile relay station switch authorization request is transmitted from the mobile communications terminal $100_1$ to the radio base station #1. Further, if a switch authorization signal is included in a switch authorization determination result transmitted by the radio base station #1 as a response to the mobile relay station switch authorization request, the relay control part 112 starts relay control.

Next, a description is given of the case where a mobile communications terminal $100_2$ (an example of the mobile communications terminal 100) is positioned at Point B with the radio base station #1 and the radio base station #2 (an example of the radio base station 200) being installed and the mobile relay station a being in operation.

At Point B, the received power level of the downlink signal transmitted by the radio base station #1, the received power level of the downlink signal transmitted by the radio base station #2, and the received power level of a downlink signal transmitted by the mobile relay station a are less than the arbitrarily set power threshold. In this case, the mobile communications terminal $100_2$ positioned at Point B determines to perform relay control. As a result, the mobile communications terminal $100_2$ operates as a mobile relay station. Hereinafter, the mobile communications terminal $100_2$ operating as a mobile relay station is referred to as "mobile relay station b.

Specifically, the reception quality measurement part 116 of the mobile communications terminal $100_2$ measures the received power level of a downlink signal in response to detection of the downlink signal. For example, the reception quality measurement part 116 of the mobile communications terminal $100_2$ measures the received power level of each of the downlink signals transmitted by the radio base station #1, the radio base station #2, and the mobile relay station a. The reception quality measurement part 116 inputs the measured received power levels of the downlink signals to the switch determination part 114. The switch determination part 114 determines whether the input received power levels of the downlink signals are less than the power threshold.

If each of the received power levels of the input downlink signals is less than the power threshold, the switch determination part 114 inputs a relay control switch command for performing relay control to the relay control part 112. In response to the relay control switch command input by the switch determination part 114, the relay control part 112 generates a mobile relay station switch authorization request, and commands the uplink radio signal transmission part 108 to transmit the generated mobile relay station switch authorization request. As a result, the mobile relay station switch authorization request is transmitted from the mobile communications terminal $100_2$ to one of the radio base station #1, the radio base station #2, and the mobile relay station a. Here, the relay control part 112 may select the destination of transmission of the mobile relay station switch authorization request from among the radio base station #1, the radio base station

2, and the mobile relay station a. For example, the relay control part 112 may select the radio base station #1 or #2 preferentially in terms of reducing the number of steps of relaying. Alternatively, the relay control part 112 may determine the destination of transmission of the mobile relay station switch authorization request based on the received power (level). For example, the relay control part 112 may select one of the radio base station #1, the radio base station #2, and the mobile relay station a which one is the highest in received power. In response to reception of a switch authorization signal transmitted from the radio base station #1, the radio base station #2, or the mobile relay station a as a response to the mobile relay station switch authorization request, the relay control part 112 starts relay control.

Next, a description is given of the case where a mobile communications terminal $100_3$ (an example of the mobile communications terminal 100) is positioned at Point C with the radio base station #1 and the radio base station #2 being installed and the mobile relay station a and the mobile relay station b being in operation.

At Point C, the downlink signal transmitted by the radio base station #2 and a downlink signal transmitted by the mobile relay station b are detected, and the received power levels of the downlink signals are less than the arbitrarily set power threshold. In this case, the mobile communications terminal $100_3$ positioned at Point C determines to perform relay control. As a result, the mobile communications terminal $100_3$ positioned at Point C operates as a mobile relay station. Hereinafter, the mobile communications terminal $100_3$ operating as a mobile relay station is referred to as "mobile relay station c.

Specifically, the reception quality measurement part 116 of the mobile communications terminal $100_3$ measures the received power level of a downlink signal in response to detection of the downlink signal. For example, the reception quality measurement part 116 of the mobile communications terminal $100_3$ measures the received power level of the downlink signal transmitted by the radio base station #2 and the received power level of the downlink signal transmitted by the mobile relay station b. The downlink signals transmitted by the radio base station #1 and the mobile relay station a are not detected at Point C. The reception quality measurement part 116 inputs the measured received power levels of the downlink signals to the switch determination part 114. The switch determination part 114 determines whether the input received power levels of the downlink signals are less than the power threshold.

If the received power levels of the input downlink signals are less than the power threshold, the switch determination part 114 inputs a relay control switch command for performing relay control to the relay control part 112. In response to the relay control switch command input by the switch determination part 114, the relay control part 112 generates a mobile relay station switch authorization request, and commands the uplink radio signal transmission part 108 to transmit the generated mobile relay station switch authorization request. As a result, the mobile relay station switch authorization request is transmitted from the mobile communications terminal $100_3$ to the radio base station #2 or the mobile relay station b. In response to reception of a switch authorization signal transmitted from the radio base station #2 or the mobile relay station b as a response to the mobile relay station switch authorization request, the relay control part 112 starts relay control.

As a result of the mobile communications terminals $100_1$, $100_2$, and $100_3$ operating as mobile relay stations, the signal power levels of downlink signals at the mobile relay stations a, b, and c are as shown in FIG. 4. According to FIG. 4, the received power of the synchronization signal is more than the power threshold at any location or distance. Accordingly, a mobile communications terminal positioned between the radio base station #1 and the radio base station #2 can ensure a radio received power level above the power threshold at any location or distance. As a result, it is possible to widen the communications area and to ensure communications quality. Further, on the carrier side, compared with the case of installing stationary radio base stations, it is possible to reduce their installation locations, their installation number, calculations of transmission power, field tests, and their additional installation for area reinforcement after the start of providing services. The transmission power depends on the range of coverage. As a result, it is possible to restrain an increase in the costs of facilities, operation, and maintenance. The above-description is given of the case where three mobile communications terminals are positioned between two radio base stations, but their numbers are not limited to these. For example, two or more than three mobile communications terminals may be positioned between two radio base stations. Alternatively, three or more radio base stations may be installed.

Next, a description is given, with reference to FIG. 3, of the radio base station 200.

The radio base station 200 according to this embodiment includes a transmission and reception sharing part 202. The transmission and reception sharing part 202 causes an uplink and a downlink to be shared with a common (shared) antenna.

Further, the radio base station 200 according to this embodiment includes an uplink radio signal reception part 204. The uplink radio signal reception part 204 receives a mobile relay station switch authorization request transmitted by the mobile communications terminal 100, and inputs the mobile relay station switch authorization request to a below-described mobile relay station determination part 208. Further, the uplink radio signal reception part 204 receives received power (a received power level) transmitted by a mobile relay station, and inputs the received power to a below-described mobile relay station monitoring part 210.

Further, the radio base station 200 according to this embodiment includes the mobile relay station determination part 208. In response to the mobile relay station switch authorization request input by the uplink radio signal reception part 204, the mobile relay station determination part 208 determines whether to cause the mobile communications terminal 100 that has transmitted the mobile relay station switch authorization request to operate or serve as a mobile relay station. For example, the mobile relay station determination part 208 determines whether to cause the mobile communications terminal 100 that has transmitted the mobile relay station switch authorization request to operate as a mobile relay station based on the condition of the mobile communications terminal 100. The mobile relay station determination part 208 may determine whether to add the mobile communications terminal 100 that has transmitted the mobile relay station switch authorization request as a mobile relay station based on at least one of the position information, type, remaining battery energy level, maximum supportable bandwidth, and number of supportable antennas of the mobile communications terminal 100. These information items may be included in the mobile relay station switch authorization request or may be reported to the radio base station 200 in another manner. The type of the mobile communications terminal 100 indicates its kind such as a mobile phone or PC. The mobile relay station determination part 208 generates a switch authorization determination result as to whether to cause the mobile communications terminal 100 that has transmitted the mobile relay station switch authorization request to operate as a mobile relay station, and causes a downlink radio signal transmission part 206 to transmit the generated switch authorization determination result. The criterion for determining whether to cause the mobile communications terminal 100 to operate as a mobile relay station may be changed depending on the state of implementation of the mobile communications terminal 100.

Further, the radio base station 200 according to this embodiment includes the mobile relay station monitoring part 210. The mobile relay station monitoring part 210 monitors a mobile relay station based on the received power at the mobile relay station input by the uplink radio signal reception part 204. For example, the mobile relay station monitoring part 210 determines that no mobile relay station is necessary at a point where the mobile relay station is positioned if the received power (level) transmitted from the mobile relay station is more than or equal to an electric power threshold (power threshold). In this case, the mobile relay station monitoring part 210 generates a mobile relay station closure/suspension instruction signal, and transmits the generated mobile relay station closure/suspension instruction signal to the mobile relay station via the downlink radio signal transmission part 206.

Since the mobile relay station is movable, the mobile relay station is not necessarily available as a relay station indefinitely. Therefore, the mobile relay station monitoring part 210 determines that the mobile relay station cannot be used as a relay station if the received power (level) transmitted from the mobile relay station is less than a level at which communications are performable. In this case, the mobile relay station monitoring part 210 generates a mobile relay station closure/suspension instruction signal, and transmits the mobile relay station closure/suspension instruction signal to the mobile relay station via the downlink radio signal transmission part 206. Then, the mobile relay station monitoring part 210 selects a mobile relay station from other mobile communications terminals.

Further, the radio base station 200 according to this embodiment includes the downlink radio signal transmission part 206. The downlink radio signal transmission part 206 transmits a switch authorization determination result input by the mobile relay station determination part 208. Further, the downlink radio signal transmission part 206 transmits a mobile relay station closure/suspension instruction signal input by the mobile relay station monitoring part 210.

Figure 5:
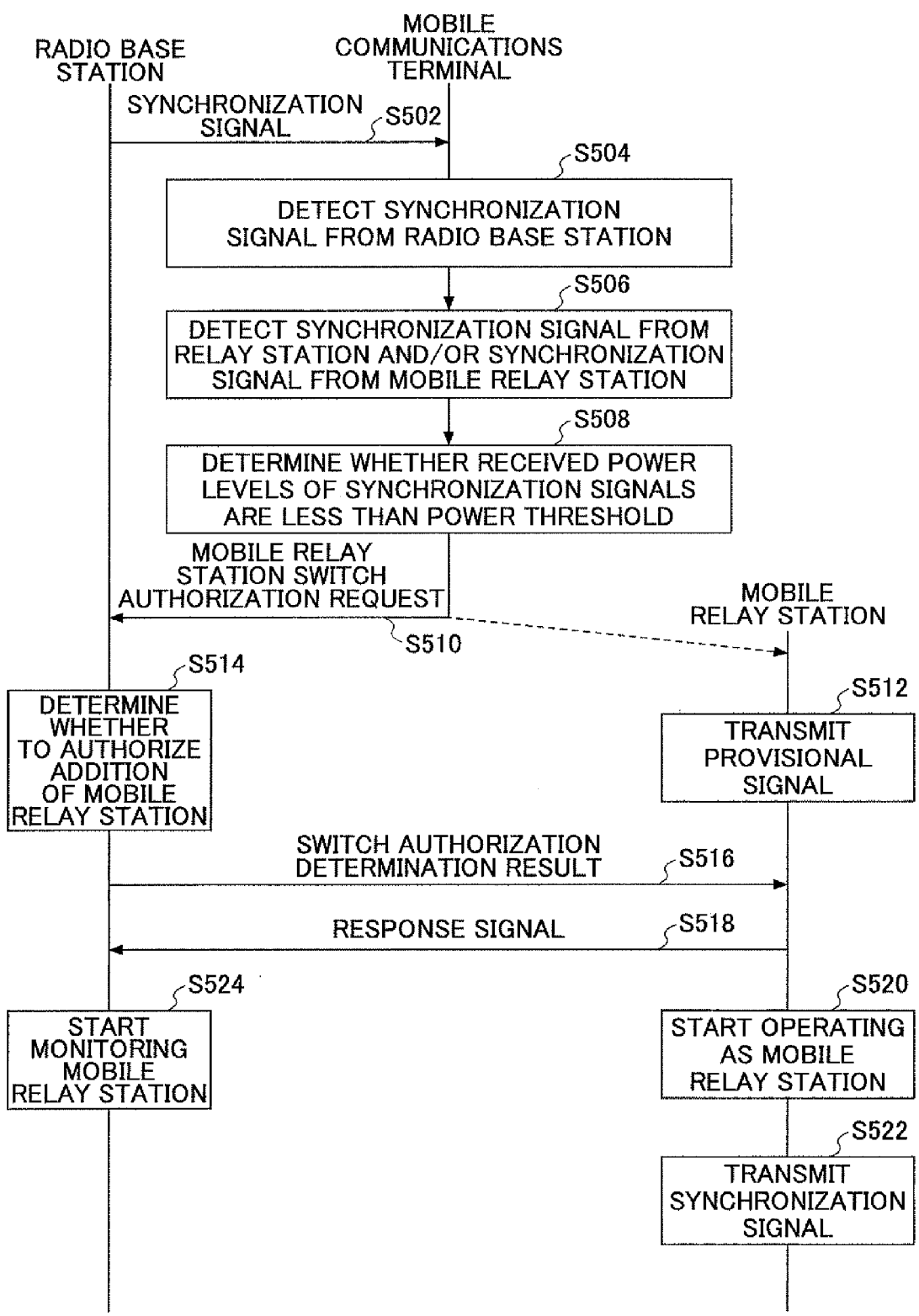
FIG. 5 is a sequence diagram illustrating operations of a radio communications system according to the first embodiment of the present invention.

Next, a description is given, with reference to FIG. 5, of operations of the radio communications system according to this embodiment. By way of example, a description is given of the case where the mobile communications terminal 100 autonomously starts to operate as a mobile relay station in the mobile communications system according to this embodiment.

Referring to FIG. 5, in step S502, the radio base station 200 transmits a synchronization signal.

In step S504, the mobile communications terminal 100 detects the synchronization signal transmitted by the radio base station 200. Then, the mobile communications terminal 100 measures the received power level of the synchronization signal transmitted by the radio base station 200 in the reception quality measurement part 116.

In step S506, the mobile communications terminal 100 detects a synchronization signal transmitted by a relay station and/or a synchronization signal transmitted by a mobile relay station. Then, in response to detection of the synchronization signals transmitted by the relay station and/or the mobile relay station, the mobile communications terminal 100 measures the received power levels of the synchronization signals in the reception quality measurement part 116.

In step S508, the mobile communications terminal 100 determines whether the received power levels of the detected synchronization signals are less than an electric power threshold (power threshold). For example, the switch determination part 114 determines whether the received power levels of the synchronization signals detected in the reception quality measurement part 116 are less than the power threshold. Here, the synchronization signals include the synchronization signal transmitted by the radio base station 200. Further, the synchronization signals include the synchronization signal transmitted by the relay station and/or the synchronization signal transmitted by the mobile relay station. Here, it is assumed that the received power levels of the detected synchronization signals are determined to be less than the power threshold. If the received power level of at least one of the detected synchronization signals is not less than the power threshold, it is determined that the position (location) of the mobile communications terminal 100 can be covered by at least a corresponding one of the radio base station 200 and the relay station and/or the mobile relay station (which one has transmitted the one of the synchronization signals).

In step S510, the mobile communications terminal 100 transmits a mobile relay station switch authorization request to the radio base station 200. For example, in response to determination that relay control be performed, the switch determination part 114 inputs a relay control switch command to the relay control part 112. In response to the relay control switch command input by the switch determination part 114, the relay control part 112 generates a mobile relay station switch authorization request, and commands the uplink radio signal transmission part 108 to transmit the generated mobile relay station switch authorization request. As a result, the mobile relay station switch authorization request is transmitted from the mobile communications terminal 100 to the radio base station 200.

In step S512, the mobile communications terminal 100 transmits a provisional signal. For example, the relay control part 112 generates a provisional signal, and commands the downlink radio signal transmission part 110 to transmit the generated provisional signal. As a result, the provisional signal is transmitted from the mobile communications terminal 100.

In step S514, based on the mobile relay station switch authorization request transmitted by the mobile communications terminal 100, the radio base station 200 determines whether to add the mobile communications terminal 100 that has transmitted the mobile relay station switch authorization request as a mobile relay station. For example, the radio base station 200 determines whether to add the mobile communications terminal 100 that has transmitted the mobile relay station switch authorization request as a mobile relay station based on the condition of the mobile communications terminal 100. The radio base station 200 may determine whether to add the mobile communications terminal 100 that has transmitted the mobile relay station switch authorization request as a mobile relay station based on at least one of the position information, type, remaining battery energy level, maximum supportable bandwidth, and number of supportable antennas of the mobile communications terminal 100. The mobile communications terminal to be added as a mobile relay station may be selected by determining whether to add the mobile communications terminal 100 that has transmitted the mobile relay station switch authorization request as a mobile relay station based on such a condition or conditions.

In step S516, the radio base station 200 transmits a switch authorization determination result including the result of the determination as to whether to add the mobile communications terminal 100 that has transmitted the mobile relay station switch authorization request as a mobile relay station to the mobile communications terminal 100. If the radio base station 200 has determined to add the mobile communications terminal 100 that has transmitted the mobile relay station switch authorization request as a mobile relay station, the switch authorization determination result includes authorization for switching (to a mobile relay station).

In step S518, in response to reception of the switch authorization determination result from the radio base station 200, the mobile communications terminal 100 transmits a signal responsive to the switch authorization determination result. This response signal includes information on the start of operation if the switch authorization determination result includes authorization for switching.

In step S520, the mobile communications terminal 100 starts operating as a mobile relay station. Specifically, the mobile communications terminal 100 transmits (relays and transfers) a received downlink signal transmitted by the radio base station 200 or the relay station to the relay station or another mobile communications terminal. Further, the mobile communications terminal 100 transmits (relays and transfers) a received uplink signal transmitted by the relay station or another mobile communications terminal to the relay station or the radio base station 200.

Further, for example, if there is another mobile relay station, the mobile communications terminal 100 transmits (relays and transfers) a received downlink signal transmitted by the radio base station 200, the relay station, or the other mobile relay station to one of the relay station, the other relay station, and another mobile communications terminal. Further, the mobile communications terminal 100 transmits (relays and transfers) a received uplink signal transmitted by the relay station, the other mobile relay station, or another mobile communications terminal to one of the radio base station 200, the relay station, or the other mobile relay station.

In step S522, the mobile communications terminal 100 transmits a downlink signal. This downlink signal includes a preamble signal and MAP information for controlling transmission to and reception from a transmission destination. The MAP information includes transmission and reception timing, information on radio resources (such as subcarriers) used for transmission and reception, and transmission and reception forms (such as a modulation method and coding rate). The transmission of step S522 may be performed before the start of the transmission of step S520, or the data to be relayed of step S520 may be transmitted in the same radio frame as the downlink signal transmitted in step S522.

The signal transmitted in step S522 is used for establishing synchronization and controlling transmission and reception at the receiving end the same as a signal transmitted by a relay station.

In step S524, the radio base station 200 starts monitoring the mobile relay station. For example, the radio base station 200 determines that no mobile relay station is necessary at a point where the mobile relay station is positioned if the received power (level) transmitted from the mobile relay station is more than or equal to an electric power threshold (power threshold). In this case, the mobile relay station monitoring part 210 generates a mobile relay station closure/suspension instruction signal, and transmits the generated mobile relay station closure/suspension instruction signal to the mobile relay station via the downlink radio signal transmission part 206. Further, the mobile relay station monitoring part 210 determines that the mobile relay station cannot be used as a relay station if the received power (level) transmitted from the mobile relay station is less than a level at which communications are performable. In this case, the mobile relay station monitoring part 210 generates a mobile relay station closure/suspension instruction signal, and transmits the mobile relay station closure/suspension instruction signal to the mobile relay station via the downlink radio signal transmission part 206. Then, in this case, the mobile relay station monitoring part 210 selects a mobile relay station based on a mobile relay station switch authorization request transmitted from another mobile communications terminal.

A procedure for communicating messages of control information defined in a radio interface may be applied to communications of control message information between the radio base station 200 and a mobile relay station. For example, a procedure for communicating messages of control information is defined in the radio interface of Mobile WiMAX as a procedure for communications of control message information between a radio base station and a relay station. (See, for example, IEEE 802.16e.)

A message transmitted by a message communication procedure always includes a reserve, but the message information as described above is not defined in currently defined messages.

According to this embodiment, the mobile communications terminal 100 autonomously operates as a relay, and can remedy communications in an area where the sensitivity to the radio signals of a stationary radio base station and a stationary relay station already installed and arranged is low.

Second Embodiment

A radio communications system according to a second embodiment of the present invention has the same configuration as that of the above-described embodiment. Further, a radio base station according to this embodiment has the same configuration as the radio base station 200 as described above with reference to FIG. 3 in the first embodiment. A mobile communications terminal according to this embodiment has the same configuration as the mobile communications terminal 100 as described above with reference to FIG. 3 in the first embodiment except for the function of the switch determination part 114.

According to this embodiment, the switch determination part 114 has multiple electric power thresholds (power thresholds). By way of example, a description is given below of the case where the switch determination part 114 has two power thresholds a and b, where the power threshold a<the power threshold b. However, the switch determination part 114 may have three or more power thresholds.

Figure 6:
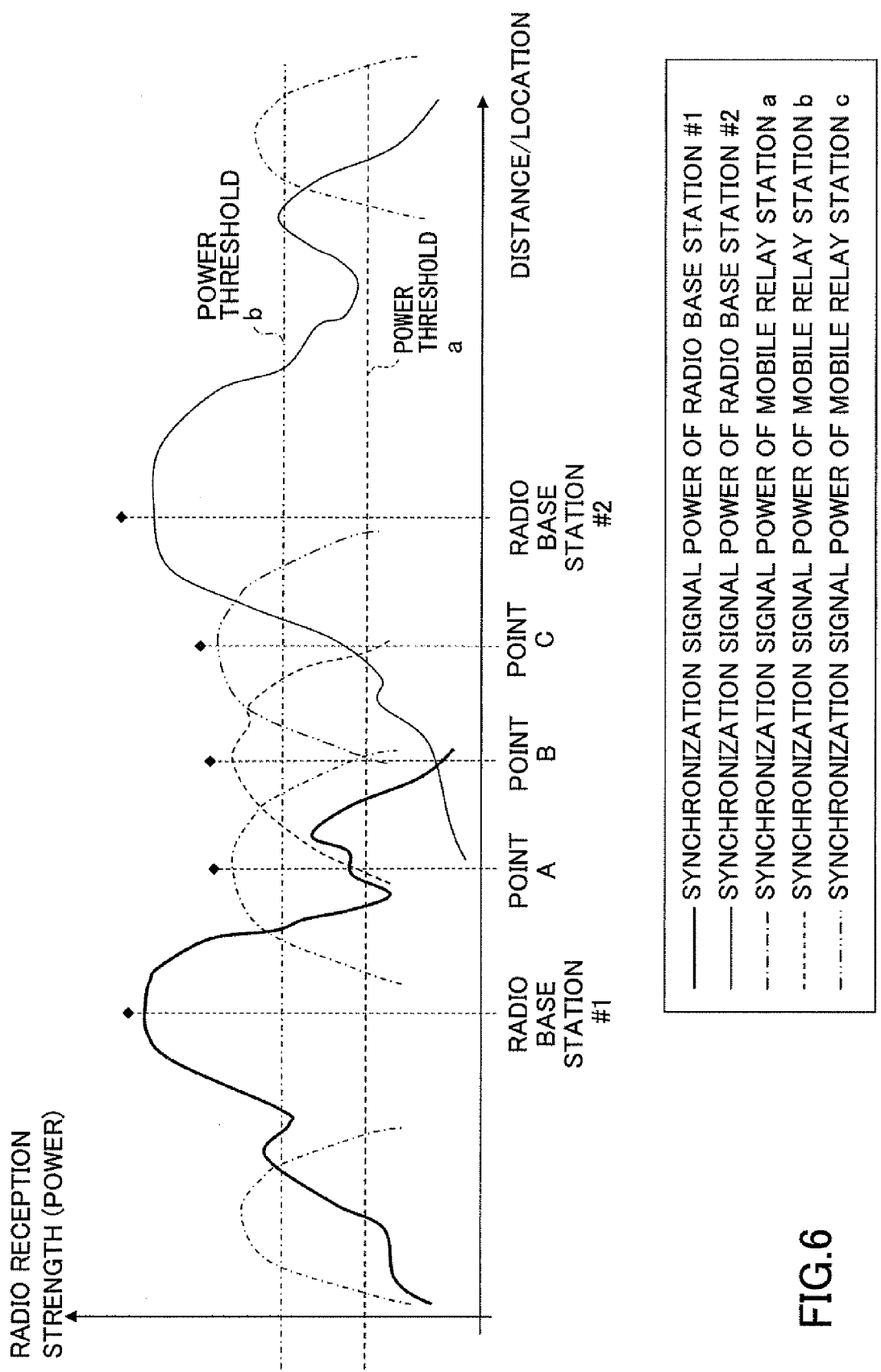
FIG. 6 is a diagram illustrating the switching of the mobile communications terminal to a mobile relay station according to a second embodiment of the present invention.

FIG. 6 is a diagram imaging part of a radio communications area in the case of the mobile communications terminal 100 switching to a mobile relay station and the mobile relay station switching (back) to the mobile communications terminal 100 according to this embodiment. In FIG. 6, the horizontal axis represents a distance or location, and the vertical axis represents radio reception strength, such as received power.

First, a description is given of the case where the mobile communications terminal $100_1$ is positioned at Point A with the radio base station #1 and the radio base station #2 being installed.

At Point A, a downlink signal transmitted from the radio base station #1 is detected. The received power (level) of the downlink signal at Point A enables communications, but is more than or equal to the power threshold a and less than the power threshold b. The power thresholds a and b are set arbitrarily. In this case, the mobile communications terminal $100_1$ positioned at Point A determines to perform relay control. As a result, the mobile communications terminal $100_1$ operates as a mobile relay station. Hereinafter, the mobile communications terminal $100_1$ operating as a mobile relay station is referred to as "mobile relay station a. For example, the power threshold a may be the received power level in the case where the received power level of a downlink signal transmitted from the radio base station #1 or #2, a relay station, or another mobile communications terminal enables communications with the radio base station #1 or #2, the relay station, or the other mobile communications terminal but is not expected to be able to ensure sufficient quality of the communications. For example, if the received power level becomes less than or equal to the power threshold a, the mobile communications terminal $100_1$ that has operated as a mobile relay station may stop its operation as a mobile relay station. Further, for example, the power threshold b may be the received power level in the case where it is determined that a relay is necessary because the received power level of the downlink signal transmitted from the radio base station #1 or #2, the relay station, or the other mobile communications terminal enables communications with the radio base station #1 or #2, the relay station, or the other mobile communications terminal but is not enough to ensure sufficient quality of the communications. For example, if the received power level is less than or equal to the power threshold b, the mobile communications terminal $100_1$ determines to operate as a mobile relay station.

For example, if the received power level of the downlink signal transmitted by the radio base station #1 and the received power level of the downlink signal transmitted by the radio base station #2 are less than the power threshold a, it is determined that the mobile communications terminal $100_1$ cannot operate as a mobile relay station. For example, the power threshold a may be a minimum received power level at which communications are performable.

Specifically, the reception quality measurement part 116 of the mobile communications terminal $100_1$ measures the received power level of a downlink signal in response to detection of the downlink signal. For example, the reception quality measurement part 116 of the mobile communications terminal $100_1$ measures the received power level of the downlink signal transmitted by the radio base station #1. At Point A, a downlink signal transmitted by the radio base station #2 is not detected. The reception quality measurement part 116 inputs the measured received power level of the downlink signal to the switch determination part 114. The switch determination part 114 determines whether the input received power level of the downlink signal is more than or equal to the power threshold a and less than the power threshold b.

If the input received power level of the downlink signal is more than or equal to the power threshold a and less than the power threshold b, the switch determination part 114 inputs a relay control switch command for requesting execution of relay control to the relay control part 112. In response to the relay control switch command input by the switch determination part 114, the relay control part 112 generates a mobile relay station switch authorization request, and commands the uplink radio signal transmission part 108 to transmit the generated mobile relay station switch authorization request. As a result, the mobile relay station switch authorization request is transmitted from the mobile communications terminal $100_1$ to the radio base station #1. Further, if a switch authorization signal is included in a switch authorization determination result transmitted by the radio base station #1 as a response to the mobile relay station switch authorization request, the relay control part 112 starts relay control.

Next, a description is given of the case where the mobile communications terminal $100_2$ is positioned at Point B with the radio base station #1 and the radio base station #2 being installed and the mobile relay station a being in operation.

At Point B, the received power level of the downlink signal transmitted by the radio base station #1 and the received power level of the downlink signal transmitted by the radio base station #2 are less than the power threshold a, and the received power level of a downlink signal transmitted by the mobile relay station a is more than or equal to the power threshold a and less than the power threshold b. In this case, the mobile communications terminal $100_2$ positioned at Point B determines to perform relay control. As a result, the mobile communications terminal $100_2$ operates as a mobile relay station. Hereinafter, the mobile communications terminal $100_2$ operating as a mobile relay station is referred to as "mobile relay station b.

Specifically, the reception quality measurement part 116 of the mobile communications terminal $100_2$ measures the received power level of a downlink signal in response to detection of the downlink signal. For example, the reception quality measurement part 116 of the mobile communications terminal $100_2$ measures the received power level of the downlink signal transmitted by the mobile relay station a. The reception quality measurement part 116 inputs the measured received power level of the downlink signal to the switch determination part 114. The switch determination part 114 determines whether the input received power level of the downlink signal is more than or equal to the power threshold a and less than the power threshold b.

If the received power level of the input downlink signal is more than or equal to the power threshold a and less than the power threshold b, the switch determination part 114 inputs a relay control switch command for performing relay control to the relay control part 112. In response to the relay control switch command input by the switch determination part 114, the relay control part 112 generates a mobile relay station switch authorization request, and commands the uplink radio signal transmission part 108 to transmit the generated mobile relay station switch authorization request. As a result, the mobile relay station switch authorization request is transmitted from the mobile communications terminal $100_2$ to the mobile relay station a. If a switch authorization signal is included in a switch authorization determination result transmitted by the mobile relay station a as a response to the mobile relay station switch authorization request, the relay control part 112 starts relay control.

Next, a description is given of the case where the mobile communications terminal $100_3$ is positioned at Point C with the radio base station #1 and the radio base station #2 being installed and the mobile relay station a and the mobile relay station b being in operation.

At Point C, the downlink signal transmitted by the radio base station #2 and a downlink signal transmitted by the mobile relay station b are detected, and the received power level of the downlink signal of the radio base station #2 is more than or equal to the power threshold a and less than the power threshold b. In this case, the mobile communications terminal $100_3$ positioned at Point C determines to perform relay control. As a result, the mobile communications terminal $100_3$ operates as a mobile relay station. Hereinafter, the mobile communications terminal $100_3$ operating as a mobile relay station is referred to as "mobile relay station c.

Specifically, the reception quality measurement part 116 of the mobile communications terminal $100_3$ measures the received power level of a downlink signal in response to detection of the downlink signal. For example, the reception quality measurement part 116 of the mobile communications terminal $100_3$ measures the received power level of the downlink signal transmitted by the radio base station #2 and the received power level of the downlink signal transmitted by the mobile relay station b. The downlink signals transmitted by the radio base station #1 and the mobile relay station a are not detected at Point C. The reception quality measurement part 116 inputs the measured received power levels of the downlink signals to the switch determination part 114. The switch determination part 114 determines whether the input received power levels of the downlink signals are more than or equal to the power threshold a and less than the power threshold b.

If both of the received power levels of the input downlink signals are less than the power threshold b and at least one of the received power levels of the input downlink signals is more than or equal to the power threshold a, the switch determination part 114 inputs a relay control switch command for performing relay control to the relay control part 112. In response to the relay control switch command input by the switch determination part 114, the relay control part 112 generates a mobile relay station switch authorization request, and commands the uplink radio signal transmission part 108 to transmit the generated mobile relay station switch authorization request. As a result, the mobile relay station switch authorization request is transmitted from the mobile communications terminal $100_3$ to the radio base station #2. In response to reception of a switch authorization signal transmitted from the radio base station #2 as a response to the mobile relay station switch authorization request, the relay control part 112 starts relay control.

As a result of the mobile communications terminals $100_1$, $100_2$, and $100_3$ operating as mobile relay stations, the signal power levels of downlink signals at the mobile relay stations a, b, and c are as shown in FIG. 6. According to FIG. 6, the received power of the synchronization signal is more than the power threshold b at any location or distance. Accordingly, a mobile communications terminal positioned between the radio base station #1 and the radio base station #2 can ensure a radio received power level above the power threshold b at any location or distance. As a result, it is possible to widen the communications area and to ensure communications quality. Further, on the carrier side, compared with the case of installing stationary radio base stations, it is possible to reduce their installation locations, their installation number, calculations of transmission power, field tests, and their additional installation for area reinforcement after the start of provision of services. The transmission power depends on the range of coverage. As a result, it is possible to restrain an increase in the costs of facilities, operation, and maintenance. The above-description is given of the case where three mobile communications terminals are positioned between two radio base stations, but their numbers are not limited to these. For example, two or more than three mobile communications terminals may be positioned between two radio base stations. Alternatively, three or more radio base stations may be installed.

The switch determination part 114 of each of the mobile relay stations a, b, and c continues to monitor the received power levels of detected downlink signals. If the received power levels of the detected downlink signals become less than the arbitrarily set power threshold a, the switch determination part 114 determines that is it not possible to perform relay control. As a result, the corresponding mobile relay station a, b, or c stops operating as a mobile relay station.

Specifically, the reception quality measurement part 116 of each of the mobile relay stations a, b, and c measures the received power level of one or more downlink signals in response to detection of the downlink signals. Then, the reception quality measurement part 116 inputs the measure received power levels of the downlink signals to the switch determination part 114. The switch determination part 114 determines whether the input received power levels of the downlink signals are less than the power threshold a.

If each of the input received power levels of the downlink signals is less than the power threshold a, the switch determination part 114 inputs a relay control stop command for stopping relay control to the relay control part 112. In response to the relay control stop command input by the switch determination part 114, the relay control part 112 generates a mobile relay station switch stop request, and causes the uplink radio signal transmission part 108 to transmit the generated mobile relay station switch stop request. As a result, the mobile relay station switch stop request is transmitted from the corresponding mobile relay station a, b, or c to a corresponding radio base station or mobile relay station to which the corresponding mobile relay station a, b, or c has transmitted the mobile relay station switch authorization request. Further, in response to reception of a stop authorization signal transmitted from the corresponding radio base station 200 or mobile relay station as a response to the mobile relay station switch stop request, the relay control part 112 suspends relay control. In this case, the mobile relay station a, b, or c periodically observes (monitors) the condition of radio communications with the radio base station 200, and autonomously stops the relay control of a radio relay station in accordance with a change in the received power and/or a change in the reception quality. Alternatively, the mobile relay station a, b, or c may observe (monitor) the condition of radio communications with the radio base station 200 at any time and autonomously stop the relay control of a radio relay station in accordance with a change in the received power.

Further, each of the mobile relay stations a, b, and c transmits the measured received power level of a downlink signal to a corresponding radio base station 200 to which the mobile relay station has transmitted a signal responsive to the switch authorization determination result. The radio base station 200 determines whether the received power level transmitted from the mobile relay station is less than the power threshold a. If the received power level is less than the power threshold a, the radio base station 200 transmits a mobile relay station closure/suspension instruction to the mobile relay station. In response to reception of the mobile relay station closure/suspension instruction, the mobile relay station transmits a signal responsive to the mobile relay station closure/suspension instruction, and stops operating as a mobile relay station.

Thereby, it is possible to determine when to cause the mobile communications terminal 100 to operate as a mobile relay station and when to cause the mobile communications terminal 100 to stop operating as a mobile relay station based on multiple power thresholds.

Third Embodiment

A radio communications system according to a third embodiment of the present invention has the same configuration as those of the above-described embodiments. Further, a radio base station and a mobile communications terminal according to this embodiment have the same configuration as the radio base station 200 and the mobile communications terminal 100, respectively, as described above with reference to FIG. 3 in the first embodiment.

According to the radio communications system of this embodiment, after transmitting a mobile relay station switch authorization request to the radio base station 200, the mobile communications terminal 100 waits until receiving a switch authorization signal without transmitting a provisional signal.

Figure 7:
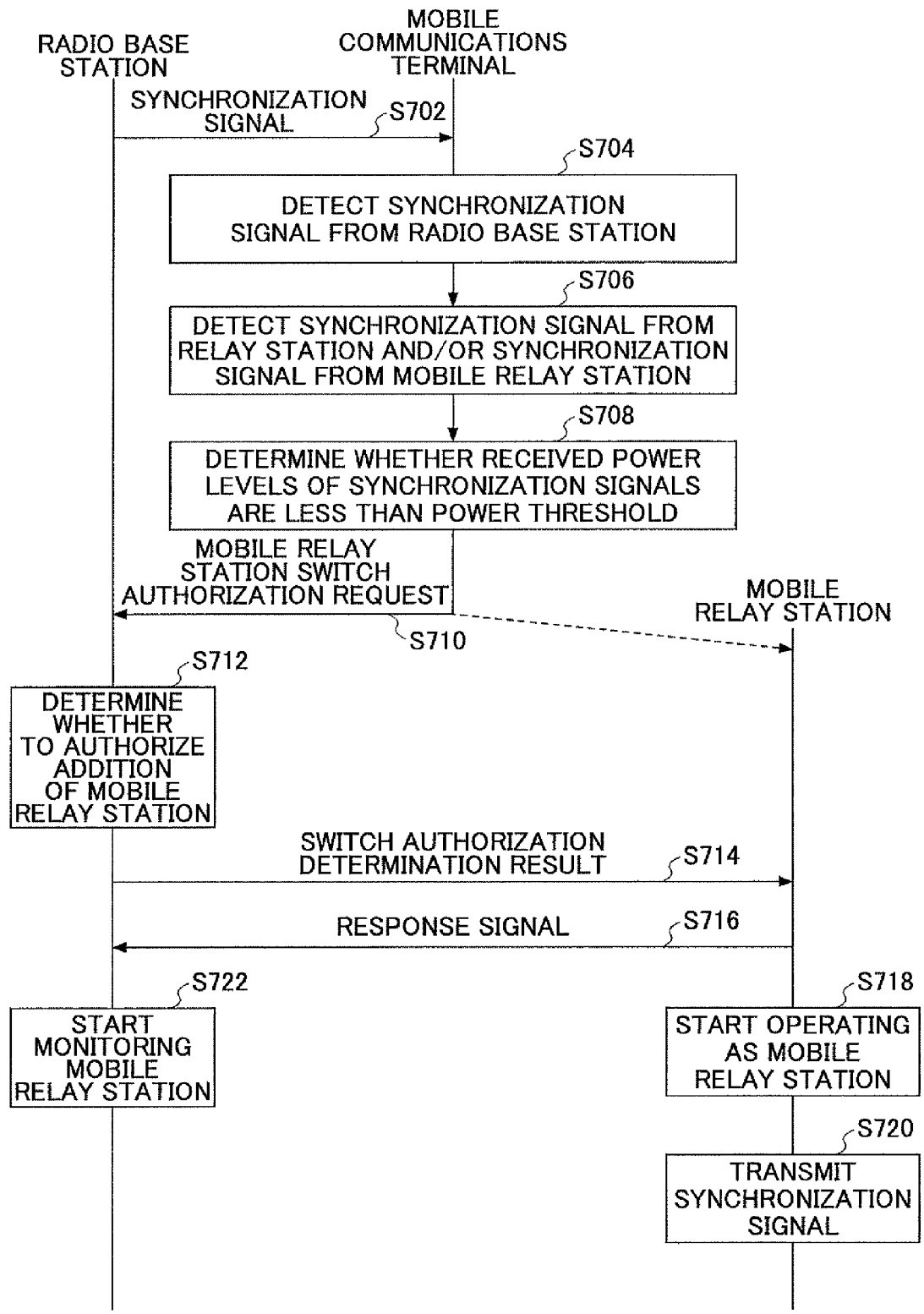
FIG. 7 is a sequence diagram illustrating operations of a radio communications system according to a third embodiment of the present invention.

Next, a description is given, with reference to FIG. 7, of operations of the radio communications system according to this embodiment. According to the radio communications system of this embodiment, the mobile communications terminal 100 autonomously starts to operate as a mobile relay station.

Referring to FIG. 7, in step S702, the radio base station 200 transmits a synchronization signal.

In step S704, the mobile communications terminal 100 detects the synchronization signal transmitted by the radio base station 200. Then, the mobile communications terminal 100 measures the received power level of the synchronization signal transmitted by the radio base station 200 in the reception quality measurement part 116.

In step S706, the mobile communications terminal 100 detects a synchronization signal transmitted by a relay station and/or a synchronization signal transmitted by a mobile relay station. Then, in response to detection of the synchronization signals transmitted by the relay station and/or the mobile relay station, the mobile communications terminal 100 measures the received power levels of the synchronization signals in the reception quality measurement part 116.

In step S708, the mobile communications terminal 100 determines whether the received power levels of the detected synchronization signals are less than an electric power threshold (power threshold). For example, the switch determination part 114 determines whether the received power levels of the synchronization signals detected in the reception quality measurement part 116 are less than the power threshold. Here, the synchronization signals include the synchronization signal transmitted by the radio base station 200. Further, the synchronization signals include the synchronization signal transmitted by the relay station and/or the synchronization signal transmitted by the mobile relay station. Here, it is assumed that the received power levels of the detected synchronization signals are determined to be less than the power threshold. If the received power level of at least one of the detected synchronization signals is not less than the power threshold, it is determined that the position (location) of the mobile communications terminal 100 can be covered by at least a corresponding one of the radio base station 200 and the relay station and/or the mobile relay station (which one has transmitted the one of the synchronization signals).

In step S710, the mobile communications terminal 100 transmits a mobile relay station switch authorization request to the radio base station 200. For example, in response to determination that relay control be performed, the switch determination part 114 inputs a relay control switch command to the relay control part 112. In response to the relay control switch command input by the switch determination part 114, the relay control part 112 generates a mobile relay station switch authorization request, and commands the uplink radio signal transmission part 108 to transmit the generated mobile relay station switch authorization request. As a result, the mobile relay station switch authorization request is transmitted from the mobile communications terminal 100 to the radio base station 200.

In step S712, based on the mobile relay station switch authorization request transmitted by the mobile communications terminal 100, the radio base station 200 determines whether to add the mobile communications terminal 100 that has transmitted the mobile relay station switch authorization request as a mobile relay station. According to this embodiment, the mobile communications terminal 100 that has transmitted the mobile relay station switch authorization request does not transmit a provisional signal. Accordingly, mobile relay station switch authorization requests may be transmitted from multiple mobile communications terminals 100. For example, the radio base station 200 selects a mobile communications terminal 100 to be caused to operate as a mobile relay station from multiple mobile communications terminals 100 that have transmitted corresponding mobile relay station switch authorization requests based on the conditions of the multiple mobile communications terminals 100. Alternatively, the radio base station 200 may determine a mobile communications terminal 100 to be caused to operate as a mobile relay station from multiple mobile communications terminals 100 that have transmitted corresponding mobile relay station switch authorization requests based on at least one of the position information, type, remaining battery energy level, maximum supportable bandwidth, and number of supportable antennas of the mobile communications terminals 100. The mobile communications terminal to be added as a mobile relay station may be selected by determining whether to add the mobile communications terminal 100 that has transmitted the mobile relay station switch authorization request as a mobile relay station based on such a condition or conditions.

In step S714, the radio base station 200 transmits a switch authorization determination result including the result of the determination as to whether to add the mobile communications terminal 100 that has transmitted the mobile relay station switch authorization request as a mobile relay station to the mobile communications terminal 100 selected from the multiple mobile communications terminals 100 as a mobile communications terminal to be caused to operate as a mobile relay station. If the radio base station 200 has determined to add the mobile communications terminal 100 that has transmitted the mobile relay station switch authorization request in step S710 as a mobile relay station, the switch authorization determination result includes authorization for switching (to a mobile relay station).

In step S716, in response to reception of the switch authorization determination result from the radio base station 200, the mobile communications terminal 100 transmits a signal responsive to the switch authorization determination result. This response signal includes information on the start of operation if the switch authorization determination result includes authorization for switching.

In step S718, the mobile communications terminal 100 starts operating as a mobile relay station.

In step S720, the mobile communications terminal 100 transmits a synchronization signal.

In step S722, the radio base station 200 starts monitoring the mobile relay station.

Fourth Embodiment

Figure 8:
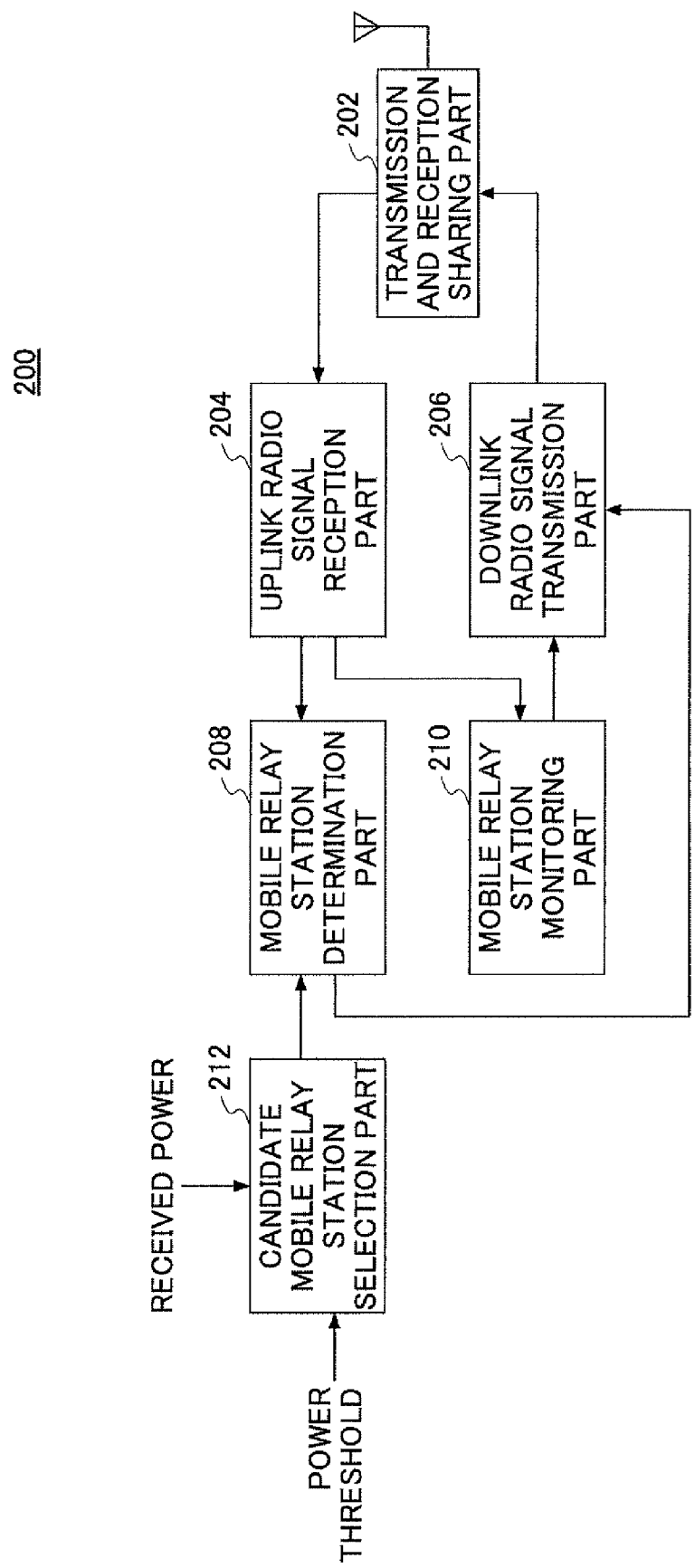
FIG. 8 is a block diagram showing part of the radio base station according to a fourth embodiment of the present invention.

A radio communications system according to a fourth embodiment of the present invention has the same configuration as those of the above-described embodiments. Further, a mobile communications terminal according to this embodiment has the same configuration as the mobile communications terminal 100 as described above with reference to FIG. 3. As illustrated in FIG. 8, a radio base station according to this embodiment further includes a candidate mobile relay station selection part 212 in addition to the configuration of the radio base station 200 described above with reference to FIG. 3.

According to the radio communications system of this embodiment, the radio base station 200 determines a mobile communications terminal to be caused to operate as a mobile relay station from multiple mobile communications terminals 100. That is, the radio base station 100 selects one of the multiple mobile communications terminals 100 as a mobile communications terminal to be caused to operate as a mobile relay station. Then, the radio base station 200 negotiates with the selected mobile communications terminal 100.

The candidate mobile relay station selection part 212 selects one or more candidates for a mobile communications terminal to be caused to operate as a mobile relay station from multiple mobile communications terminals 100 based on their respective received power levels transmitted (reported) therefrom. Then, the candidate mobile relay station selection part 212 inputs the candidates for the mobile communications terminal to be caused to operate as a mobile relay station to the mobile relay station determination part 208. The mobile relay station determination part 208 determines one of the input candidates as the mobile communications terminal to be caused to operate as a mobile relay station, and has negotiations with the determined one of the candidates for causing the determined one of the candidates to operate as a mobile relay station.

Figure 9:
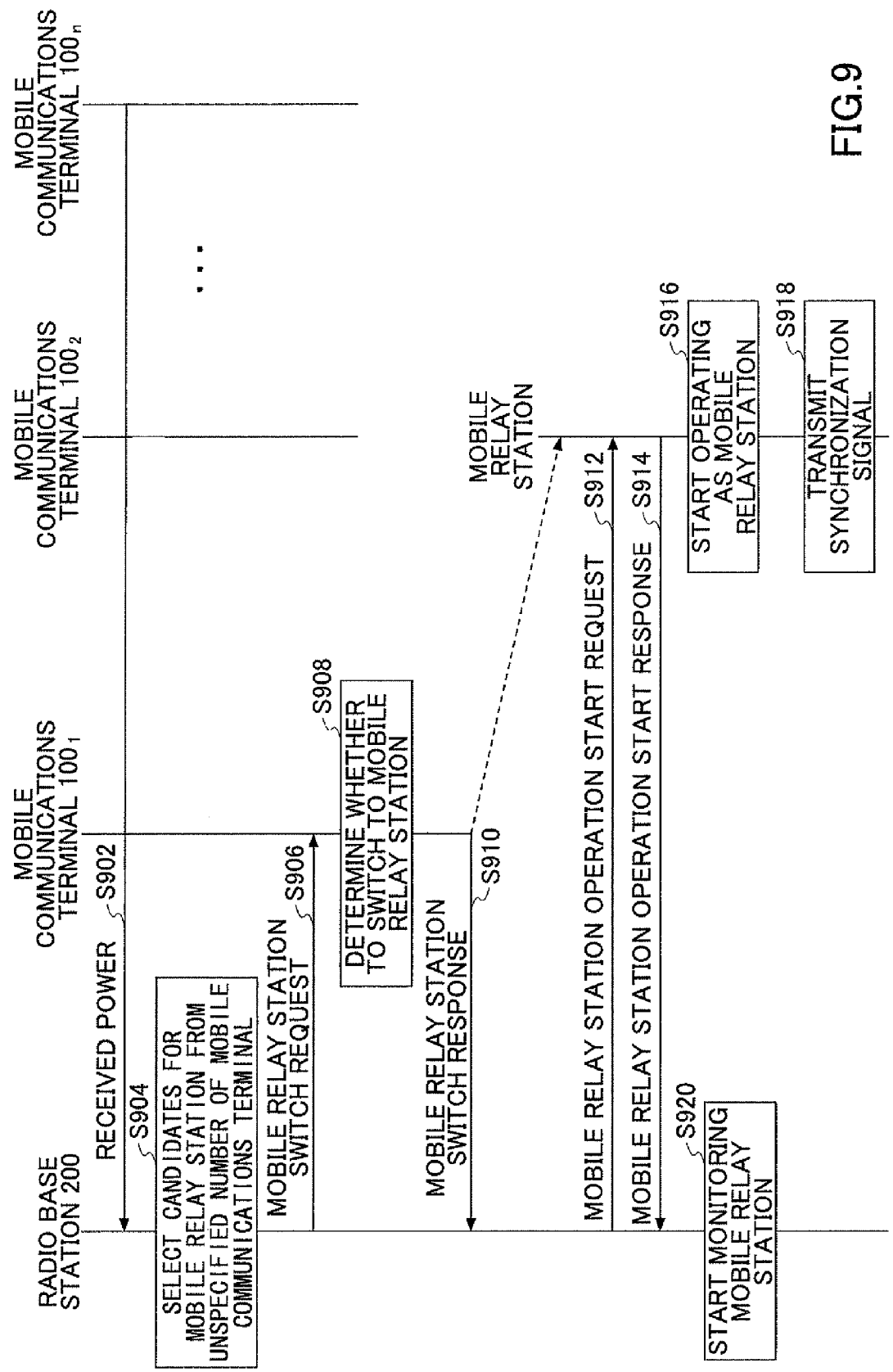
FIG. 9 is a sequence diagram illustrating operations of a radio communications system according to the fourth embodiment of the present invention.

Next, a description is given, with reference to FIG. 9, of operations of the radio communications system according to this embodiment.

Referring to FIG. 9, multiple mobile communications terminals $100_1$ through $100_n$, where n is an integer greater than zero (n>0), are accessing the radio base station 200 by radio.

In step S902, each of the mobile communications terminals $100_1$ through $100_n$ measures the received power level of a synchronization signal transmitted by the radio base station 200, and reports the measured received power level to the radio base station 200. Further, the radio base station 200 may also be notified of other information measured by the mobile communications terminals $100_1$ through $100_n$. Here, the mobile communications terminals $100_1$ through $100_n$ are in the area covered by the radio base station 200. The mobile communications terminals $100_1$ through $100_n$ conduct handoffs (handovers) to other radio base stations.

In step S904, the radio base station 200 selects one or more candidates for a mobile communications terminal to be caused to operate a mobile relay station from the mobile communications terminals $100_1$ through $100_n$ based on the received power levels transmitted (reported) therefrom. For example, the candidate mobile relay station selection part 212 selects candidates for a mobile communications terminal to be caused to operate a mobile relay station from the mobile communications terminals $100_1$ through $100_n$ based on their conditions, and inputs the selected candidates to the mobile relay station determination part 208. The candidate mobile relay station selection part 212 may also select candidates for a mobile communications terminal to be caused to operate a mobile relay station in the same manner as in the above-described first or second embodiment based on the received power levels transmitted from the mobile communications terminals $100_1$ through $100_n$ and one or more power thresholds, and input the selected candidates to the mobile relay station determination part 208.

In step S906, the radio base station 200 determines one of the candidates as the mobile communications terminal to be caused to operate a mobile relay station, and transmits a mobile relay station switch request to the determined one of the candidates. For example, the mobile relay station determination part 208 determines the mobile communications terminal to be caused to operate a mobile relay station from among the candidates therefor input by the candidate mobile relay station selection part 212. Then, the mobile relay station determination part 208 generates a mobile relay station switch request to be transmitted to the determined mobile communications terminal, and commands the downlink radio signal transmission part 206 to transmit the generated mobile relay station switch request. For example, the mobile relay station determination part 208 may select one of the candidates which one is the lowest in received power level. Here, a description is given of the case where the mobile communications terminal $100_1$ is determined as the mobile communications terminal to be caused to operate a mobile relay station and a mobile relay station switch request is transmitted to the mobile communications terminal $100_1$.

In step S908, in response to reception of the mobile relay station switch request, the mobile communications terminal $100_1$ determines whether to switch to a mobile relay station. For example, the mobile relay station switch request is input to the switch determination part 114. The switch determination part 114 may determine whether to switch to a mobile relay station based on at least one of the position information, type, remaining battery energy level, maximum supportable bandwidth, and number of supportable antennas of the mobile communications terminal $100_1$.

In step S910, the mobile communications terminal $100_1$ transmits a mobile relay station switch response including the result of the determination as to whether to switch to a mobile relay station to the radio base station 200.

In step S912, if the received mobile relay station switch response includes information indicating acceptance (authorization) of switching to a mobile relay station, the radio base station 200 transmits a mobile relay station operation start request to the mobile communications terminal $100_1$. For example, the mobile relay station switch response is input to the mobile relay station determination part 208. If the input mobile relay station switch response includes information indicating acceptance of switching to a mobile relay station, the mobile relay station determination part 208 transmits a mobile relay station operation start request to the mobile communications terminal $100_1$. On the other hand, if the received mobile relay station switch response includes information indicating rejection of switching to a mobile relay station, the mobile relay station determination part 208 determines the mobile communications terminal to be caused to operate a mobile relay station from among the (other) remaining candidates therefor. That is, the mobile relay station determination part 208 determines (selects) another one of the candidates as the mobile communications terminal to be caused to operate a mobile relay station. Then, the mobile relay station determination part 208 performs the same operation as described above. Here, the mobile relay station determination part 208 may update the candidates based on the candidates for the mobile communications terminal to be caused to operate a mobile relay station input by the candidate mobile relay station selection part 212.

In step S914, in response to reception of the mobile relay station operation start request, the mobile communications terminal $100_1$ transmits a mobile relay station operation start response indicating the start of operation as a mobile relay station to the radio base station 200. For example, the switch determination part 114 inputs a relay control switch command to the relay control part 112 in response to the mobile relay station operation start request transmitted by the radio base station 200. In response to the relay control switch command input by the switch determination part 114, the relay control part 112 generates a mobile relay station operation start response, and commands the uplink radio signal transmission part 108 to transmit the generated mobile relay station operation start response. As a result, the mobile relay station operation start response is transmitted from the mobile communications terminal 100₁ to the radio base station 200.

In step S916, the mobile communications terminal 100₁ starts operating as a mobile relay station.

In step S918, the mobile communications terminal 100₁ transmits a synchronization signal.

In step S920, the radio base station 200 starts monitoring the mobile relay station.

Fifth Embodiment

Figure 10:
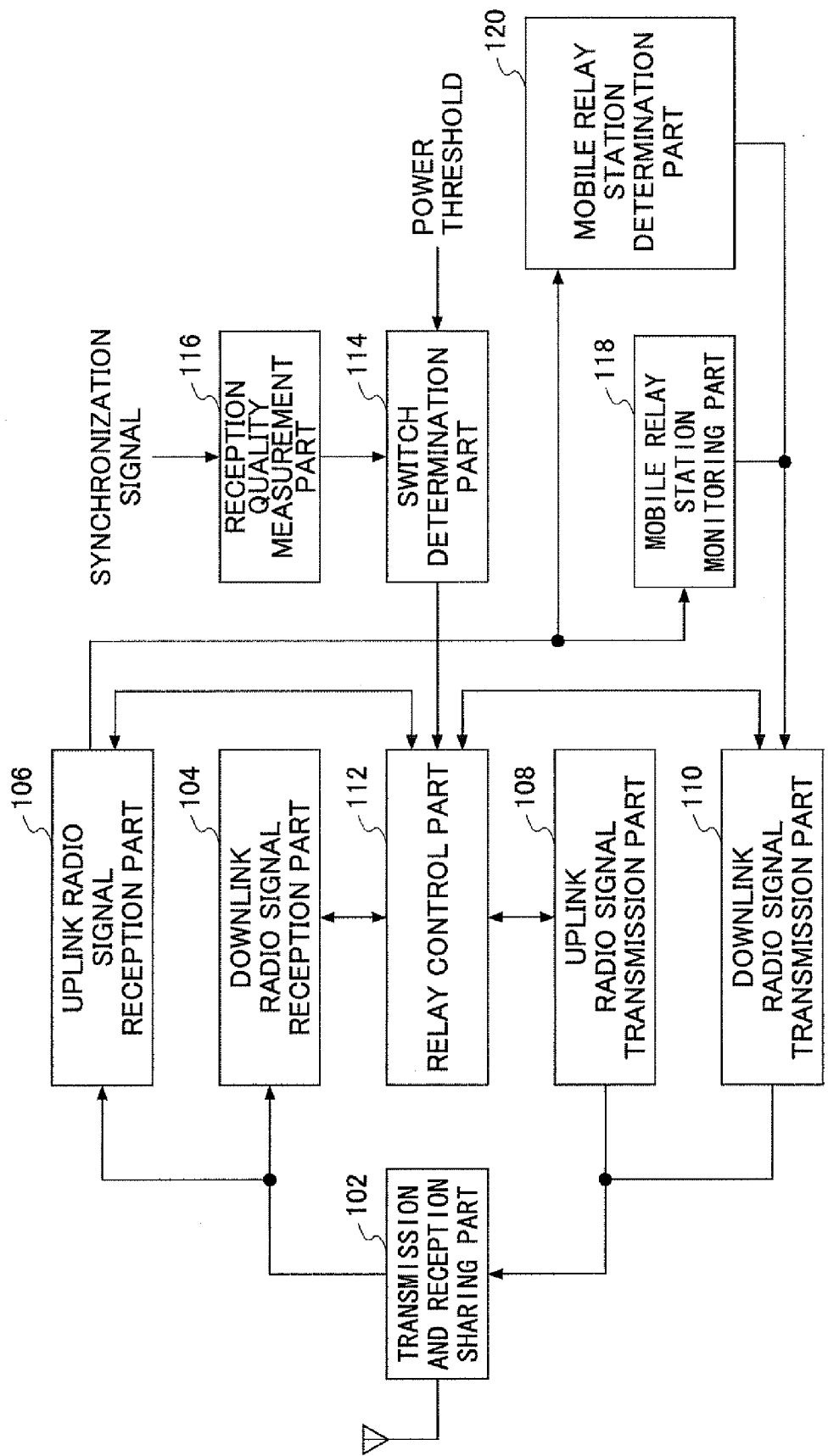
FIG. 10 is a block diagram showing part of the mobile communications terminal according to a fifth embodiment of the present invention.

A radio communications system according to a fifth embodiment of the present invention has the same configuration as those of the above-described embodiments. As illustrated in FIG. 10, a mobile communications terminal according to this embodiment further includes a mobile relay station monitoring part 118 and a mobile relay station determination part 120 in addition to the configuration of the mobile communications terminal 100 described above with reference to FIG. 3.

According to the radio communications system of this embodiment, the mobile communications terminal 100 that performs relay control performs operations as the above-described radio base station 200 according to the first embodiment. Alternatively, the mobile communications terminal 100 that performs relay control according to this embodiment may perform operations as the above-described radio base station 200 according to the second embodiment. In response to a mobile relay station switch authorization request input by the uplink radio signal reception part 106, the mobile relay station determination part 120 determines whether to cause a mobile communications terminal 100 that has transmitted the mobile relay station switch authorization request to operate as a mobile relay station. For example, the mobile relay station determination part 120 determines whether to cause a mobile communications terminal 100 that has transmitted the mobile relay station switch authorization request to operate as a mobile relay station based on the condition of the mobile communications terminal 100 that has transmitted the mobile relay station switch authorization request. Further, the mobile relay station determination part 120 may determine whether to add the mobile communications terminal 100 that has transmitted the mobile relay station switch authorization request as a mobile relay station based on at least one of the position information, type, remaining battery energy level, maximum supportable bandwidth, and number of supportable antennas of the mobile communications terminal 100 that has transmitted the mobile relay station switch authorization request. These information items may be included in the mobile relay station switch authorization request or may be reported in another manner. The type of the mobile communications terminal 100 indicates its kind such as a mobile phone or PC. The mobile relay station determination part 120 generates a switch authorization determination result as to whether to cause the mobile communications terminal 100 that has transmitted the mobile relay station switch authorization request to operate as a mobile relay station, and transmits the generated switch authorization determination result through the downlink radio signal transmission part 110.

The mobile relay station monitoring part 118 monitors another mobile relay station based on the received power at the mobile relay station input by the uplink radio signal reception part 106. For example, the mobile relay station monitoring part 118 determines that no mobile relay station is necessary at a point where the other mobile relay station is positioned if the received power (level) transmitted from the other mobile relay station is more than or equal to an electric power threshold (power threshold). In this case, the mobile relay station monitoring part 118 generates a mobile relay station closure/suspension instruction signal, and transmits the generated mobile relay station closure/suspension instruction signal to the other mobile relay station via the downlink radio signal transmission part 110.

Since the mobile relay station is movable, the mobile relay station is not necessarily available as a relay station indefinitely. Therefore, the mobile relay station monitoring part 118 determines that the other mobile relay station cannot be used as a relay station if the received power (level) transmitted from the other mobile relay station is less than a level at which communications are performable. In this case, the mobile relay station monitoring part 118 generates a mobile relay station closure/suspension instruction signal, and transmits the mobile relay station closure/suspension instruction signal to the other mobile relay station via the downlink radio signal transmission part 110.

Figure 11:
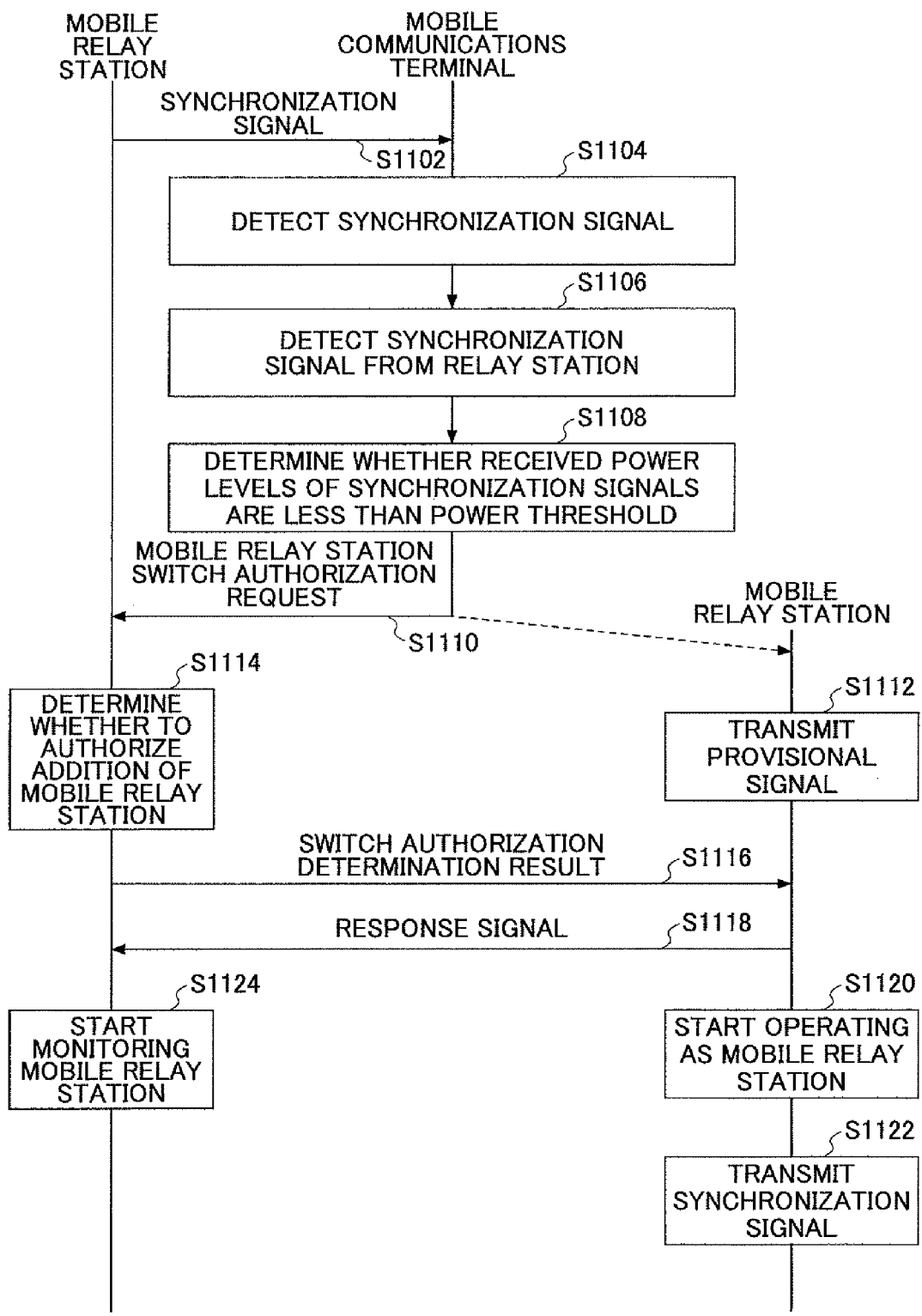
FIG. 11 is a sequence diagram illustrating operations of a radio communications system according to the fifth embodiment of the present invention.

Next, a description is given, with reference to FIG. 11, of operations of the radio communications system according to this embodiment.

Referring to FIG. 11, in step S1102, a first mobile communications terminal 100 operating as a mobile relay station transmits a synchronization signal.

In step S1104, a second mobile communications terminal 100 detects the synchronization signal transmitted by the mobile relay station. Then, the second mobile communications terminal 100 measures the received power level of the synchronization signal transmitted by the mobile relay station in the reception quality measurement part 116.

In step S1106, the second mobile communications terminal 100 detects a synchronization signal transmitted by a relay station. Then, in response to detection of the synchronization signal transmitted by the relay station, the second mobile communications terminal 100 measures the received power level of the synchronization signal in the reception quality measurement part 116.

In step S1108, the second mobile communications terminal 100 determines whether the received power levels of the detected synchronization signals are less than an electric power threshold (power threshold). For example, the switch determination part 114 determines whether the received power levels of the synchronization signals detected in the reception quality measurement part 116 are less than the power threshold. Here, the synchronization signals include the synchronization signal transmitted by the mobile relay station. Further, the synchronization signals include the synchronization signal transmitted by the relay station and received by the second mobile communications terminal 100. Here, it is assumed that the received power levels of the detected synchronization signals are determined to be less than the power threshold. If the received power level of at least one of the detected synchronization signals is not less than the power threshold, it is determined that the position (location) of the second mobile communications terminal 100 can be covered by at least a corresponding one of the mobile relay station and the relay station (which one has transmitted the one of the synchronization signals).

In step S1110, the second mobile communications terminal 100 transmits a mobile relay station switch authorization request to the relay station. For example, in response to determination that relay control be performed, the switch determination part 114 inputs a relay control switch command to the relay control part 112. In response to the relay control switch command input by the switch determination part 114, the relay control part 112 generates a mobile relay station switch authorization request, and commands the uplink radio signal transmission part 108 to transmit the generated mobile relay station switch authorization request. As a result, the mobile relay station switch authorization request is transmitted from the second mobile communications terminal 100 to the mobile relay station.

In step S1112, the second mobile communications terminal 100 transmits a provisional signal. For example, the relay control part 112 generates a provisional signal, and commands the downlink radio signal transmission part 110 to transmit the generated provisional signal. As a result, the provisional signal is transmitted from the second mobile communications terminal 100.

In step S1114, based on the mobile relay station switch authorization request transmitted by the second mobile communications terminal 100, the mobile relay station determines whether to add the second mobile communications terminal 100 that has transmitted the mobile relay station switch authorization request as a mobile relay station. For example, the mobile relay station determines whether to add the second mobile communications terminal 100 that has transmitted the mobile relay station switch authorization request as a mobile relay station based on the condition of the second mobile communications terminal 100. The mobile relay station may determine whether to add the second mobile communications terminal 100 that has transmitted the mobile relay station switch authorization request as a mobile relay station based on at least one of the position information, type, remaining battery energy level, maximum supportable bandwidth, and number of supportable antennas of the second mobile communications terminal 100. The mobile communications terminal to be added as a mobile relay station may be selected by determining whether to add the second mobile communications terminal 100 that has transmitted the mobile relay station switch authorization request as a mobile relay station based on such a condition or conditions.

In step S1116, the mobile relay station transmits a switch authorization determination result including the result of the determination as to whether to add the second mobile communications terminal 100 that has transmitted the mobile relay station switch authorization request as a mobile relay station to the second mobile communications terminal 100. If the mobile relay station has determined to add the second mobile communications terminal 100 that has transmitted the mobile relay station switch authorization request as a mobile relay station, the switch authorization determination result includes authorization for switching (to a mobile relay station).

In step S1118, in response to reception of the switch authorization determination result from the mobile relay station, the second mobile communications terminal 100 transmits a signal responsive to the switch authorization determination result. This response signal includes information on the start of operation if the switch authorization determination result includes authorization for switching.

In step S1120, the second mobile communications terminal 100 starts operating as a mobile relay station.

In step S1122, the second mobile communications terminal 100 transmits a downlink signal. This downlink signal includes a synchronization signal.

In step S1124, the mobile relay station starts monitoring the second mobile communications terminal 100 that has switched to a mobile relay station.

Sixth Embodiment

A radio communications system according to a sixth embodiment of the present invention has the same configuration as those of the above-described embodiments. Further, a mobile communications terminal according to this embodiment has the same configuration as the mobile communications terminal 100 as described above with reference to FIG. 10.

According to the radio communications system of this embodiment, after transmitting a mobile relay station switch authorization request to a first mobile communications terminal 100 operating as a mobile relay station, a second mobile communications terminal 100 waits until receiving a switch authorization signal without transmitting a provisional signal.

Figure 12:
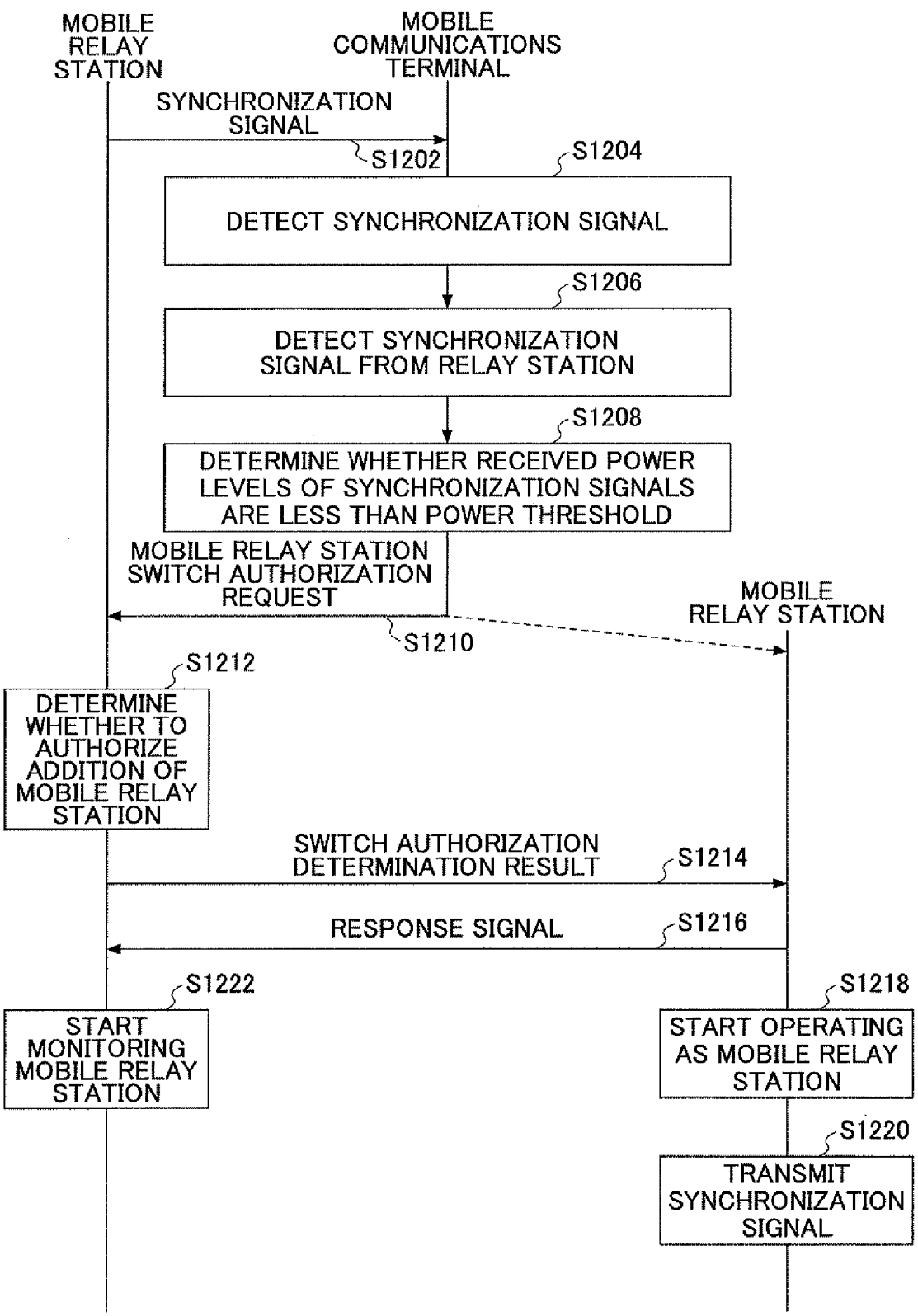
FIG. 12 is a sequence diagram illustrating operations of a radio communications system according to a sixth embodiment of the present invention.

Next, a description is given, with reference to FIG. 12, of operations of the radio communications system according to this embodiment. Referring to FIG. 12, in step S1202, the mobile relay station transmits a synchronization signal.

In step S1204, the second mobile communications terminal 100 detects the synchronization signal transmitted by the mobile relay station. Then, the second mobile communications terminal 100 measures the received power level of the synchronization signal transmitted by the mobile relay station in the reception quality measurement part 116.

In step S1206, the second mobile communications terminal 100 detects a synchronization signal transmitted by a relay station. Then, in response to detection of the synchronization signal transmitted by the relay station, the second mobile communications terminal 100 measures the received power level of the synchronization signal in the reception quality measurement part 116.

In step S1208, the second mobile communications terminal 100 determines whether the received power levels of the detected synchronization signals are less than an electric power threshold (power threshold). For example, the switch determination part 114 determines whether the received power levels of the synchronization signals detected in the reception quality measurement part 116 are less than the power threshold. Here, the synchronization signals include the synchronization signals transmitted by the relay station and/or the mobile relay station and received by the second mobile communications terminal 100. Here, it is assumed that the received power levels of the detected synchronization signals are determined to be less than the power threshold. If the received power level of at least one of the detected synchronization signals is not less than the power threshold, it is determined that the position (location) of the second mobile communications terminal 100 can be covered by at least a corresponding one of the relay station and the mobile relay station (which one has transmitted the one of the synchronization signals).

In step S1210, the second mobile communications terminal 100 transmits a mobile relay station switch authorization request to the mobile relay station. For example, in response to determination that relay control be performed, the switch determination part 114 inputs a relay control switch command to the relay control part 112. In response to the relay control switch command input by the switch determination part 114, the relay control part 112 generates a mobile relay station switch authorization request, and commands the uplink radio signal transmission part 108 to transmit the generated mobile relay station switch authorization request. As a result, the mobile relay station switch authorization request is transmitted from the second mobile communications terminal 100 to the mobile relay station.

In step S1212, based on the mobile relay station switch authorization request transmitted by the second mobile communications terminal 100, the mobile relay station determines whether to add the second mobile communications terminal 100 that has transmitted the mobile relay station switch authorization request as a mobile relay station. According to this embodiment, the mobile second communications terminal 100 that has transmitted the mobile relay station switch authorization request does not transmit a provisional signal. Accordingly, mobile relay station switch authorization requests may be transmitted from multiple mobile communications terminals 100. For example, the mobile relay station selects a mobile communications terminal 100 to be caused to operate as a mobile relay station from multiple mobile communications terminals 100 that have transmitted corresponding mobile relay station switch authorization requests based on the conditions of the multiple mobile communications terminals 100. Alternatively, the mobile relay station may determine a mobile communications terminal 100 to be caused to operate as a mobile relay station from multiple mobile communications terminals 100 that have transmitted corresponding mobile relay station switch authorization requests based on at least one of the position information, type, remaining battery energy level, maximum supportable bandwidth, and number of supportable antennas of the mobile communications terminals 100. The mobile communications terminal to be added as a mobile relay station may be selected by determining whether to add the mobile communications terminal 100 that has transmitted the mobile relay station switch authorization request as a mobile relay station based on such a condition or conditions.

In step S1214, the mobile relay station transmits a switch authorization determination result including the result of the determination as to whether to add the second mobile communications terminal 100 that has transmitted the mobile relay station switch authorization request as a mobile relay station to the mobile communications terminal 100 selected from the multiple mobile communications terminals 100 as a mobile communications terminal to be caused to operate as a mobile relay station. If the mobile relay station has determined to add the second mobile communications terminal 100 that has transmitted the mobile relay station switch authorization request in step S1210 as a mobile relay station, the switch authorization determination result includes authorization for switching (to a mobile relay station).

In step S1216, in response to reception of the switch authorization determination result from the mobile relay station, the second mobile communications terminal 100 transmits a signal responsive to the switch authorization determination result. This response signal includes information on the start of operation if the switch authorization determination result includes authorization for switching.

In step S1218, the second mobile communications terminal 100 starts operating as a mobile relay station.

In step S1220, the second mobile communications terminal 100 that has started operating as a mobile relay station transmits a synchronization signal.

In step S1222, the mobile relay station starts monitoring the second mobile communications terminal 100 that has started operating as a mobile relay station.

Seventh Embodiment

Figure 13:
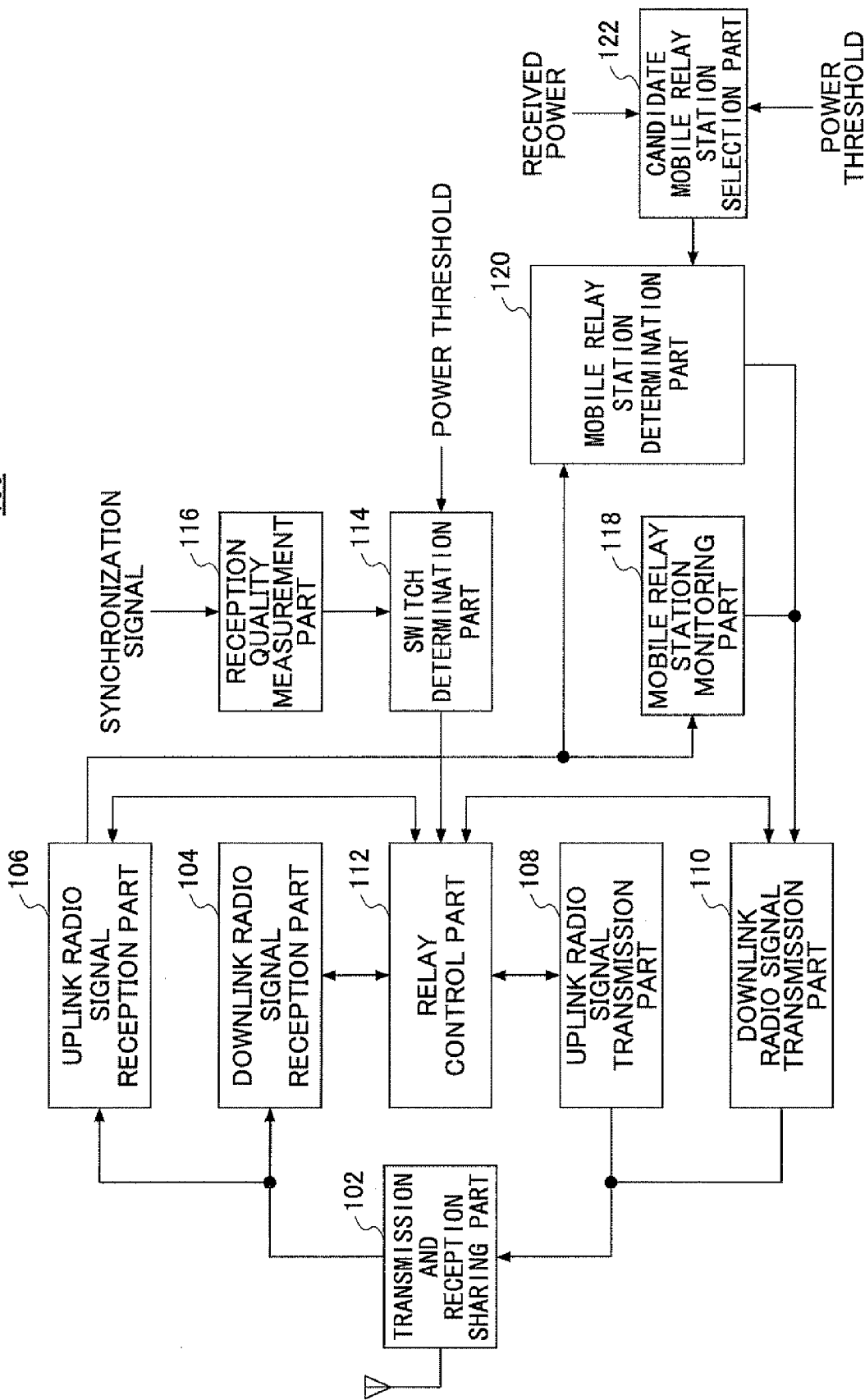
FIG. 13 is a block diagram showing part of the mobile communications terminal according to a seventh embodiment of the present invention.

A radio communications system according to a seventh embodiment of the present invention has the same configuration as those of the above-described embodiments. Further, as illustrated in FIG. 13, a mobile communications terminal according to this embodiment further includes a candidate mobile relay station selection part 122 in addition to the configuration of the mobile communications terminal 100 described above with reference to FIG. 10.

According to the radio communications system of this embodiment, a mobile relay station determines a mobile communications terminal to be caused to operate as a mobile relay station from multiple mobile communications terminals 100. That is, the mobile relay station selects one of the multiple mobile communications terminals 100 as a mobile communications terminal to be caused to operate as a mobile relay station. Then, the mobile relay station negotiates with the selected mobile communications terminal 100.

The candidate mobile relay station selection part 122 selects one or more candidates for a mobile communications terminal to be caused to operate as a mobile relay station from multiple mobile communications terminals 100 based on their respective received power levels transmitted (reported) therefrom. Then, the candidate mobile relay station selection part 122 inputs the candidates for the mobile communications terminal to be caused to operate as a mobile relay station to the mobile relay station determination part 120. The mobile relay station determination part 120 determines one of the input candidates as the mobile communications terminal to be caused to operate as a mobile relay station, and has negotiations with the determined one of the candidates for causing the determined one of the candidates to operate as a mobile relay station.

Figure 14:
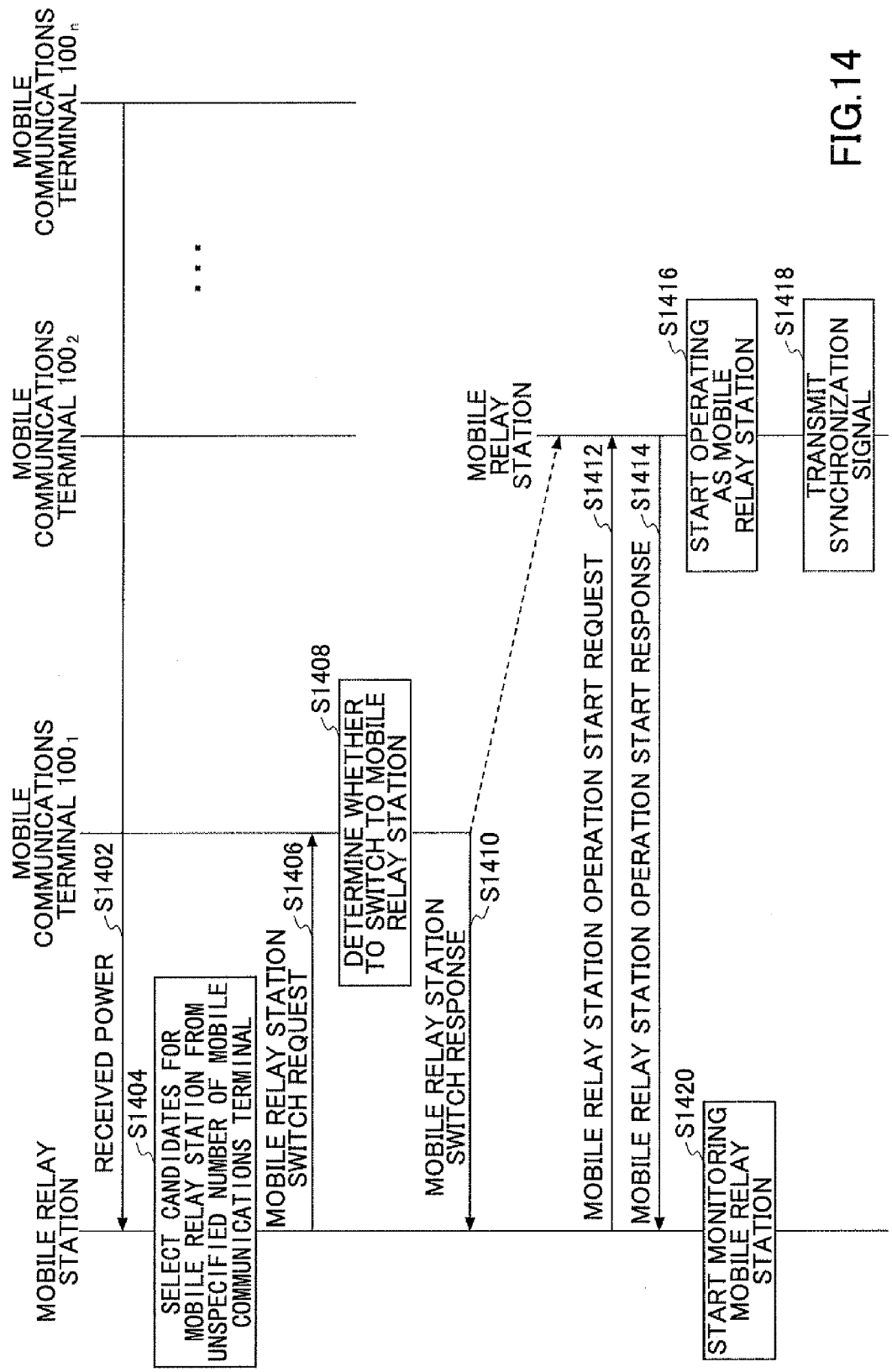
FIG. 14 is a sequence diagram illustrating operations of a radio communications system according to the seventh embodiment of the present invention.

Next, a description is given, with reference to FIG. 14, of operations of the radio communications system according to this embodiment.

Referring to FIG. 14, multiple mobile communications terminals $100_1$ through $100_n$, where n is an integer greater than zero (n>0), are accessing a mobile relay station (mobile communications terminal 100) by radio.

In step S1402, each of the mobile communications terminals $100_1$ through $100_n$ measures the received power level of a synchronization signal transmitted by the mobile relay station, and reports the measured received power level to the mobile relay station. Further, the mobile relay station may also be notified of other information measured by the mobile communications terminals $100_1$ through $100_n$.

Here, the mobile communications terminals $100_1$ through $100_n$ are in the area covered by the mobile relay station. The mobile communications terminals $100_1$ through $100_n$ conduct handoffs (handovers) to the radio base station 200, a relay station, or another mobile relay station.

In step S1404, the mobile relay station selects one or more candidates for a mobile communications terminal to be caused to operate a mobile relay station from the mobile communications terminals $100_1$ through $100_n$ based on the received power levels transmitted (reported) therefrom. For example, the candidate mobile relay station selection part 122 selects candidates for a mobile communications terminal to be caused to operate a mobile relay station from the mobile communications terminals $100_1$ through $100_n$ based on their conditions, and inputs the selected candidates to the mobile relay station determination part 120. The candidate mobile relay station selection part 122 may also select candidates for a mobile communications terminal to be caused to operate a mobile relay station in the same manner as in the above-described fifth or sixth embodiment based on the received power levels reported by the mobile communications terminals $100_1$ through $100_n$ and one or more power thresholds, and input the selected candidates to the mobile relay station determination part 120.

In step S1406, the mobile relay station determines one of the candidates as the mobile communications terminal to be caused to operate a mobile relay station, and transmits a mobile relay station switch request to the determined one of the candidates. For example, the mobile relay station determination part 120 determines the mobile communications terminal to be caused to operate a mobile relay station from among the candidates therefor input by the candidate mobile relay station selection part 122. Then, the mobile relay station determination part 120 generates a mobile relay station switch request to be transmitted to the determined mobile communications terminal, and commands the downlink radio signal transmission part 110 to transmit the generated mobile relay station switch request. For example, the mobile relay station determination part 120 may select one of the candidates which one is the lowest in received power level. Here, a description is given of the case where the mobile communications terminal $100_1$ is determined as the mobile communications terminal to be caused to operate a mobile relay station and a mobile relay station switch request is transmitted to the mobile communications terminal $100_1$.

In step S1408, in response to reception of the mobile relay station switch request, the mobile communications terminal $100_1$ determines whether to switch to a mobile relay station. For example, the mobile relay station switch request is input to the switch determination part 114. The switch determination part 114 may determine whether to switch to a mobile relay station based on at least one of the position information, type, remaining battery energy level, maximum supportable bandwidth, and number of supportable antennas of the mobile communications terminal $100_1$.

In step S1410, the mobile communications terminal $100_1$ transmits a mobile relay station switch response including the result of the determination as to whether to switch to a mobile relay station to the mobile relay station.

In step S1412, if the received mobile relay station switch response includes information indicating acceptance (authorization) of switching to a mobile relay station, the mobile relay station transmits a mobile relay station operation start request to the mobile communications terminal $100_1$. For example, the mobile relay station switch response is input to the mobile relay station determination part 120. If the input mobile relay station switch response includes information indicating acceptance of switching to a mobile relay station, the mobile relay station determination part 120 transmits a mobile relay station operation start request to the mobile communications terminal $100_1$. On the other hand, if the received mobile relay station switch response includes information indicating rejection of switching to a mobile relay station, the mobile relay station determination part 120 determines the mobile communications terminal to be caused to operate a mobile relay station from among the remaining candidates therefor other than the mobile communications terminal $100_1$. That is, the mobile relay station determination part 120 determines (selects) another one of the candidates as the mobile communications terminal to be caused to operate a mobile relay station. Then, the mobile relay station determination part 120 performs the same operation as described above. Here, the mobile relay station determination part 120 may update the candidates based on the candidates for the mobile communications terminal to be caused to operate a mobile relay station input by the candidate mobile relay station selection part 122.

In step S1414, in response to reception of the mobile relay station operation start request, the mobile communications terminal $100_1$ transmits a mobile relay station operation start response indicating the start of operation as a mobile relay station to the mobile relay station. For example, the switch determination part 114 inputs a relay control switch command to the relay control part 112 in response to the mobile relay station operation start request transmitted by the mobile relay station. In response to the relay control switch command input by the switch determination part 114, the relay control part 112 generates a mobile relay station operation start response, and commands the uplink radio signal transmission part 108 to transmit the generated mobile relay station operation start response. As a result, the mobile relay station operation start response is transmitted from the mobile communications terminal $100_1$ to the mobile relay station.

In step S1416, the mobile communications terminal $100_1$ starts operating as a mobile relay station.

In step S1418, the mobile communications terminal $100_1$ that has started operating as a mobile relay station transmits a synchronization signal.

In step S1420, the mobile relay station starts monitoring the mobile communications terminal $100_1$ that has started operating as a mobile relay station.

According to one aspect of the present invention, a mobile communications terminal can autonomously switch between operating as a normal mobile communications terminal and operating also as a radio relay station in a multi-hop relay radio communications system.

Further, in a service area (coverage) of mobile radio communications, a radio base station and a radio relay station fixed at certain locations cannot cover the service area completely, so that radio propagation loss significantly increases at some points. According to embodiments of the present invention, however, a mobile communications terminal switches to a mobile relay station sometime somewhere, thereby making it possible to cover the points of high radio propagation loss as a radio relay area. As a result, 99% or more of the area can be covered by relay stations. Further, the throughput in relay communications and the communications between mobile communications terminals can be approximately doubled.

Further, the development of mobile radio communications technologies has made it possible to transmit (communicate) large-capacity data at high speed. On the other hand, bilateral access is necessary between mobile communications terminals and radio base stations. Therefore, with an increasing number of users accessing, radio base stations tend to be pressed in the capacity of data communications. Further, there is a growing demand for data communications where an unspecified number of mobile communications terminals perform grouping among themselves without accessing radio base stations. In this case, there is the problem of the occurrence of radio interference with radio base stations, and ensuring the quality of radio communications becomes an issue. Therefore, if a mobile communications terminal operates as a mobile relay station, the mobile communications terminal is caused to operate as a host terminal as well.

The mobile communications terminal 100 operating as a mobile relay station transmits, to an unspecified number of mobile communications terminals 100, a signal confirming whether to perform radio communications by grouping among themselves, and receives response signals from the unspecified number of mobile communications terminals 100. The mobile communications terminal 100 operating as a mobile relay station operates as a host terminal.

In the case of starting communications between mobile communications terminals 100, the mobile relay station operating as a host terminal transmits a request signal to a radio base station so as to be authorized to receive allocation of a band to be used for communications between mobile communications terminals 100. Based on the authorization to receive a band allocation for communications between mobile communications terminals 100, the mobile relay station operating as a host terminal becomes a host of communications between mobile communications terminals 100, and authorizes other mobile communications terminals 100 to make access and determines allocation of access among mobile communications terminals 100. When ending the communications between mobile communications terminals 100, the host terminal notifies the radio base station of the end of the operation. The radio base station closes the band for communications between mobile communications terminals that has been released.

Thus, in the case where communications are performed among an unspecified number of mobile communications terminals 100, adjustments are made on the allocation of a radio band with a radio base station and a relay station, thereby reducing radio interference and flexibly releasing and closing a radio band. As a result, it is possible to prevent a decrease in the capacity of data communications. Here, the decrease in the capacity of data communications includes a decrease in throughput.

Thus, according to one aspect of the present invention, a mobile communications terminal is provided that can relay data, and a communication control method is provided that enables a mobile communications terminal to relay data.

The present invention is not limited to the specifically disclosed embodiments, and variations and modifications may be made without departing from the scope of the present invention.

The present application is based on Japanese Priority Patent Application No. 2008-072558, filed on Mar. 19, 2008, the entire contents of which are hereby incorporated by reference.

What is claimed is:

1. A mobile communications terminal, comprising:
   a determination part configured to determine whether said mobile communications terminal is to operate as a relay station based on a signal received from at least one of a radio base station, a stationary relay station, and another mobile communications terminal performing relay control; and
   a control part configured to control said mobile communications terminal so that said mobile communications terminal autonomously starts to operate as the relay station in response to the determination part determining that said mobile communications terminal is to operate as the relay station.

2. The mobile communications terminal as claimed in claim 1, wherein operating as the relay station is to relay the signal received from at least one of the base station, the stationary relay station, and the other mobile communications terminal performing the relay control or a signal received from a yet another mobile communications terminal performing no relay control.

3. The mobile communications terminal as claimed in claim 1, wherein operating as the relay station includes transmission of at least one of a preamble and control information for transmission and reception to at least one of the stationary relay station, the other mobile communications terminal performing the relay control, and a yet another mobile communications terminal performing no relay control.

4. The mobile communications terminal as claimed in claim 1, wherein the determination part is configured to determine whether said mobile communications terminal is to operate as the relay station based on a downlink signal received from the at least one of the radio base station, the stationary relay station, and the other mobile communications terminal performing the relay control.

5. The mobile communications terminal as claimed in claim 4, wherein the determination part is configured to determine whether said mobile communications terminal is to operate as the relay station based on a threshold below which a received power level of the downlink signal is not expected to ensure sufficient communications quality although enabling a communication with the at least one of the radio base station, the stationary relay station, and the other mobile communications terminal performing the relay control.

6. The mobile communications terminal as claimed in claim 5, wherein:
   the determination part is configured to determine whether said mobile communications terminal is to operate as the relay station based further on an additional threshold; and
   the determination part is configured to determine that said mobile communications terminal is to operate as the relay station in response to the received power level of the downlink signal being less than the threshold and more than or equal to the additional threshold.

7. The mobile communications terminal as claimed in claim 6, wherein the additional threshold is a minimum received power level at which the communication with the at least one of the radio base station, the stationary relay station, and the other mobile communications terminal performing the relay control is performable.

8. The mobile communications terminal as claimed in claim 4, wherein the determination part is configured to determine that said mobile communications terminal is to operate as the relay station in response to a received power level of the downlink signal not being expected to ensure sufficient communications quality although enabling a communication with the at least one of the radio base station, the stationary relay station, and the other mobile communications terminal performing the relay control.

9. The mobile communications terminal as claimed in claim 4, wherein the control part is configured to transmit a relay control switch authorization request signal for requesting an authorization to switch to the relay station to the at least one of the radio base station, the stationary relay station, and the other mobile communications terminal performing the relay control in response to the determination part determining that said mobile communications terminal is to operate as the relay station, and to operate as the relay station in response to receiving a signal authorizing the switching to the relay station as a response to the relay control switch authorization request signal.

10. The mobile communications terminal as claimed in claim 9, wherein the control part is configured to transmit a signal for notifying other mobile communications terminals of the transmission of the relay control switch authorization request signal.

11. The mobile communications terminal as claimed in claim 9, wherein the determination part is configured to notify the at least one of the radio base station, the stationary relay station, and the other mobile communications terminal performing the relay control of suspension of operating as the relay station in response to determining that said mobile communications terminal is to suspend operating as the relay station.

12. The mobile communications terminal as claimed in claim 4, wherein the downlink signal includes a synchronization signal.

13. The mobile communications terminal as claimed in claim 1, further comprising:
- a relay station determination part configured to determine whether said mobile communications terminal is to cause a yet another mobile communications terminal to operate as another relay station based on a relay control switch authorization request signal for requesting an authorization to switch to the other relay station transmitted from the yet another mobile communications terminal; and
- a monitoring part configured to monitor the yet another mobile communications terminal in response to the relay station determination part determining that said mobile communications terminal is to cause the yet another mobile communications terminal to operate as the other relay station.

14. A communication control method in a radio communications system having multi-hop relay communications applied thereto, the communication control method comprising:
- a mobile communications terminal determining whether said mobile communications terminal is to operate as a relay station based on a downlink signal received from at least one of a radio base station, a stationary relay station, and another mobile communications terminal performing relay control; and
- the mobile communications terminal performing control so as to autonomously start to operate as the relay station in response to determining that said mobile communications terminal is to operate as the relay station.

15. The communication control method as claimed in claim 14, wherein operating as the relay station is to relay the signal received from at least one of the base station, the stationary relay station, and the other mobile communications terminal performing the relay control or a signal received from a yet another mobile communications terminal performing no relay control.

16. The communication control method as claimed in claim 14, wherein operating as the relay station includes transmission of at least one of a preamble and control information for transmission and reception to at least one of the stationary relay station, the other mobile communications terminal performing the relay control, and a yet another mobile communications terminal performing no relay control.

* * * * *